(12) United States Patent
Rabin et al.

(10) Patent No.: US 6,889,209 B1
(45) Date of Patent: May 3, 2005

(54) METHOD AND APPARATUS FOR PROTECTING INFORMATION AND PRIVACY

(75) Inventors: Michael O. Rabin, Cambridge, MA (US); Dennis E. Shasha, New York, NY (US)

(73) Assignee: ShieldIP, Inc., New York, NY (US)

( * ) Notice: Subject to any disclaimer, the term of this patent is extended or adjusted under 35 U.S.C. 154(b) by 706 days.

(21) Appl. No.: 09/706,074

(22) Filed: Nov. 3, 2000

(51) Int. Cl.[7] ............................................. G06F 17/60
(52) U.S. Cl. ........................ 705/57; 705/1; 705/50; 705/51; 705/53; 705/58
(58) Field of Search ................. 705/1, 50, 51, 705/53, 57, 58

(56) References Cited

U.S. PATENT DOCUMENTS

| | | | | |
|---|---|---|---|---|
| 5,606,663 A | * | 2/1997 | Kadooka | 713/202 |
| 5,613,004 A | * | 3/1997 | Cooperman et al. | 380/28 |
| 5,719,941 A | * | 2/1998 | Swift et al. | 713/155 |
| 5,892,900 A | * | 4/1999 | Ginter et al. | 713/200 |
| 6,115,802 A | * | 9/2000 | Tock et al. | 711/216 |
| 6,134,327 A | | 10/2000 | Van Oorschot | |
| 6,170,058 B1 | * | 1/2001 | Kausik | 713/193 |
| 6,240,184 B1 | * | 5/2001 | Huynh et al. | 380/206 |
| 6,341,352 B1 | * | 1/2002 | Child et al. | 713/201 |

FOREIGN PATENT DOCUMENTS

JP    411136618 A   *  5/1999   ............ H04N/5/91

OTHER PUBLICATIONS

Digimarc:Digimac watermarking technology receives U.S. patent; Jun. 11, 1997; Business Wire.*

* cited by examiner

*Primary Examiner*—James P. Trammell
*Assistant Examiner*—Calvin Hewitt
(74) *Attorney, Agent, or Firm*—Hamilton, Brook, Smith and Reynolds, P.C.

(57) ABSTRACT

A mechanism for the purchase of tags for copies of software ensures that identity of the purchaser of a tag table identifier value included in a purchased tag is not revealed. A mechanism of Call-Ups from the user device to a guardian center ensures that each tag table identifier value appears in only one user device and that the data included in a tag table and other data stored in the user device for the purpose of protecting vendor's and owner's rights in software, cannot be modified.

29 Claims, 21 Drawing Sheets

METHOD AND APPARATUS FOR PROTECTING INFORMATION AND PRIVACY

BACKGROUND OF THE INVENTION

Software or information piracy is the activity of using or making copies of software or information without the authorization of the creator or legitimate owner of that software or information. Piracy is prevalent in the computer software application industry where people frequently make unlicenced illegal copies of a software application. The application may be copied for use among a circle of acquaintances or for re-production and commercial profit. Other types of piracy include acts of copying information such as musical recordings or an electronically readable version of documentation or an electronic book. In all cases, piracy costs billions of dollars of lost profits to legitimate business annually.

The software and information technology industries have responded to the threat of piracy through the use of locking schemes. Locking schemes can include software locking mechanisms, licenses and specialized hardware devices which prevent unauthorized use of software, information, or an entire electronic device. These schemes seek to prevent adversaries from being able to freely copy software.

There are many types of software locking mechanisms. For example, a manufacturer can encrypt portions of a copy of a software program with an encryption key uniquely associated with that copy. A customer who purchases the software is given the associated decryption key which allows decryption and execution of the software. Another form of software protection mechanism involves a "Certificate of Authenticity" supplied with the purchase of a copy of a software program. The Certificate of Authenticity includes a unique number associated with the copy. During installation of the copy of software, the copy number is requested and must be entered correctly by the user. If the copy number entered matches a number expected by the installation program, the copy of the software is assumed to be legitimate and is installed and executed as being legitimate. If the number entered is incorrect, the software will not install properly. Neither of the above schemes provides full protection against illegal copying and use of software. For the scheme employing encryption, if the original customer wishes to distribute illegal copies, he or she needs only to transfer the copy together with the decryption key to others. Similarly, the original purchaser of the copy of software can circumvent the protection offered by the Certificate of Authenticity by passing the software along with the Certificate of Authenticity to other users.

Protection against piracy schemes often employ features of a User Device's operating system. Thus, it is important to protect the operating system against modifications that would circumvent the protections. Ensuring that an operating system is unmodified can be achieved though hardware. An example of a hardware protection scheme for the integrity of the operating system is provided in U.S. Pat. No. 3,996,449 which discloses a method for determining if a program or a portion of a program when running on a computer is unmodified. In this system, a hash function is applied to a user's identification code or key along with the text of the program itself in a special tamper-proof hardware checking device. The checking device compares a resulting value from the hash function with a verifier value to see if the program text is correct. If the text is correct, the program is allowed to execute on the device.

Schemes to protect against piracy using hardware entail attaching a device to the processor, typically through a communications port of the User Device. These types of hardware devices are often called "dongles". Protection schemes may employ dongles in a variety of ways. For example, software may have a specific dongle associated with it where that dongle stores information or a number unique to that software. The software periodically checks whether the dongle is present at the communications port by requesting the information or number. One dongle is sold with each copy of the software. Since, presumably, the dongle cannot be reproduced, there can be only as many running copies of the software as there are dongles sold. In another application of dongles to protection against piracy of software, the dongle is an attached processor that executes parts of the application program which are inaccessible to the user. Again, the program cannot be executed without having the dongle attached to the User Device. Protection through dongles has a number of severe disadvantages. First, the user needs one dongle per protected program and has to attach and replace dongles when switching between programs. Users find this to be an inconvenience. Second, dongles are viable only provided they are tamper-proof and their internal algorithms and data are hidden from an attacker. In many instances in the past, both of these provisions have been violated by sophisticated, determined pirates. Third, in many instances software protected against piracy through dongles has been modified so as to eliminate the reference to dongles and thereby circumvent the protection. Finally, in the coming years where software will be preferably downloaded to customers through the Internet, accompanying physical devices such as dongles cannot be downloaded and thus become a burden to commerce.

Another hardware related approach assigns a unique identifier to each processor that can execute software. Software copies purchased for a User Device include the identifier of the processor on that device. When a User Device executes a software copy, the identifier included in that software copy is compared with the Device's processor identifier. Processing is enabled only if these two identifiers are equal. This approach has a number of drawbacks. In its basic version, there is no stopping a pirate from modifying a legitimate software copy by replacing the original identifier with the identifiers of the processors on which he or his illegal customers wish to install this software. Furthermore, this method inextricably links a software copy to a single User Device. This renders it impossible to move the software another User Device as required, for example, when a customer upgrades his computer. Finally, the unique processor identifier on User Devices has raised grave concerns of intrusion on users' privacy through monitoring their software purchases which are identified by the same number.

Digital water marking is a technique that places invisible, or inaudible identifying data in certain types of content primarily to identify the user to whom the content was sold. If that same content is found elsewhere, then the original buyer is suspected of participating in privacy.

Ideally, watermarks are persistent in that they can not be removed or altered without degrading the content. While these techniques contribute to detection of theft, they do not prevent someone from copying the content, so they require legal intervention to prevent continued copyright infringement. Further there are many attacks on such systems.

SUMMARY OF THE INVENTION

In accordance with the invention, a method for linking a first software module with a second software module is presented. A public key is stored in the first software module. A stub digitally signed by an owner of the public key is associated with the second software module. A hash function value is computed on of the second software module and the first software module is linked with the second software module upon verifying by use of said public key the digital signature on the stub and that the computed hash function value equals a hash function value included in the digitally signed stub.

The second software module is one of a plurality of software modules to be linked and the first software module includes a plurality of previously linked software modules. The steps of computing and verifying may be performed by a dedicated processor.

Alternatively, a first software module is linked with a second software module by storing a first hash function value in the first software module, computing a second hash function value on a portion of the contents of the second software module and linking the first software module with the second software module upon verifying that the second hash function value is equal to the first hash function value. The second software module is one of a plurality of software modules to be linked. The first software module includes a plurality of previously linked software modules. The steps of computing and verifying may be performed by a dedicated processor.

In one embodiment a user device includes a first storage module and a second storage module into which a software module is stored. Verification software is stored in the first storage module. The verification software verifies that a portion of said software module is authorized by computing a hash function value on the portion and comparing the computed hash function value with a hash function value stored in the verification software.

The first storage is difficult to modify by software means. The user device may also include a public key within the first storage module, an additional verification software within the first storage module and a digitally signed stub within the second storage module. The digitally signed stub is associated with the second software module. The additional verification software computes a hash function value on a portion of said second software module and verifies by use of said public key that the digitally signed stub includes a digital signature on the computed hash function value.

In an alternate embodiment a user device includes a first storage module. A public key and verification software are stored in the first storage module. The user device also includes a second storage module into which a software module is stored. A digitally signed stub is associated with the second software module. The verification software computes a hash function value on a portion of said second software module and verifies by use of said public key that the digitally signed stub associated with said second software module includes a digital signature on the computed hash function value. The user device also includes a hash function value within the first storage module. The verification software further verifies that a portion of said second software module is authorized by computing a hash function value on the portion and comparing the computed hash function value with a hash function value stored in the verification software.

A watchdog program includes a value, a function to compute and means for verifying a software module stored in memory by computing the function on a sequence of locations in the software module and comparing the result of the computation with the value.

The function may be a hash function and the means for verifying computes the hash function value on the sequence of locations and compares the result of the computation with the value.

The watchdog program can include a watchdog action and means for performing said watchdog action dependent on the result of the comparison. The watchdog action may include halting the operation of a user device on which said watchdog program is executing.

The watchdog program can include a plurality of watchdog actions and means for performing at least one watchdog action dependent on the result of the comparison.

The watchdog program can include means for performing a need-to-check test and means for determining whether to perform the function on the sequence of locations in the software module dependent on the result of the need-to-check test.

The watchdog program can include a plurality of sequences of locations, a plurality of stored values, a plurality of watchdog actions and means for performing at least one said watchdog action dependent on the result of a comparison between values computed by the function on the plurality of sequences of locations and the stored values. The watchdog program can also include a plurality of memory locations, means for selecting a software module and means for storing a start execution time and an end execution time for said software module in said memory locations.

The watchdog program can be a subroutine stored in a watchdog field in another program. The subroutine is placed within the watchdog field in a location dependent on conditions present when said another program is loaded. The location of said subroutine is changed after said subroutine is loaded. The placement of calls to the subroutine is determined based on conditions present when said another program is loaded. The placement of calls to the subroutine is changed after said subroutine is loaded. The watchdog action may include moving other watchdog subroutines within a watchdog field.

A tag table includes a tag table identifier having a value, a tag for a copy of software, and a digitally signed message. The tag includes said tag table identifier value and a hash function value of a portion of said copy of software and the digitally signed message comprising the tag table identifier value and the hash function value. The tag further comprises a usage policy and said digitally signed message further comprises a usage policy. The tag further comprises a name and said digitally signed message further comprises a name. The tag table may also include a hash function value for the tag table sent from a guardian center in a previous guardian center call-up. The tag table may also include a header. The header includes a continuation message sent from a guardian center in a previous guardian center call-up. The tag table may also include usage statistics for the copy of software.

A method for purchasing software is presented. A purchaser creates a data structure. The data structure includes a tag table identifier value associated with a tag table in a user device and an identification of the software. The purchaser computes a hash function value of the data structure and sends a message to a vendor. The message comprises the hash function value and the identification of the software.

Upon receiving the message, the vendor digitally signs the message and returns the signed message to the purchaser. A supervising program on the user device verifies the digital signature on the signed message by use of the vendor's public key and that the signed message includes the message sent by the purchaser. A hash function value of a portion of the software may be stored in the identification of software. The supervising program verifies that the hash function value in the identification of software equals the hash function value of the portion of the software. The supervising program may store a tag for the software in the tag table. The tag includes the tag table identifier value, the purchaser-created data structure, and the signed vendor message. A secure communication channel may be established between the purchaser and the vendor before sending the message. The data structure may include a usage policy and the message further comprises the usage policy. The data structure may include a new randomly chosen value occurring only once. The message may include a proof of payment for the software.

A method for decommissioning a copy of software in a user device is presented. A supervising program removes a tag associated with the copy of software from a tag table in the user device. The tag includes a digitally signed portion and a tag table identifier value. A communications channel is provided from the user device to a vendor. The user device sends the tag to the vendor on the communication channel. The vendor verifies the digital signature on the digitally signed portion by use of the public key of the vendor and the vendor reads the tag table identifier value.

The vendor sends a certificate of credit to a purchaser of the tag. The vendor sends the digitally signed portion of the tag and the tag table identifier value to a guardian center. The guardian center stores the digitally signed portion of the tag and links the digitally signed portion of the tag to the tag table identifier value.

The guardian center transmits a continuation message to the supervising program in the user device. The continuation message includes the digitally signed portion of the tag and the tag table identifier value. The supervising program verifies that the digitally signed portion of the tag having the tag table identifier value is not stored in the tag table.

A method for supervising usage of software on a user device is presented. A supervising program on the user device computes a first hash function value of a tag table and sends a call-up message to a guardian center. The call up message includes the first hash function value, an identifier value of the tag table, and a second hash function value of the tag table sent in a previous call-up message. The guardian center verifies that the hash function value of the tag table sent in the previous call-up message is the value most recently stored in a list of hash function values stored by the guardian center and associated with the identifier value of the tag table. Upon successful verification, the guardian center appends the received first tag table hash function value to the list of hash function values associated with the identifier value of the tag table and sends a digitally signed continuation message to the supervising program, the continuation message comprising the call-up message.

The supervising program verifies that a portion of the digitally signed guardian center continuation message is equal to the corresponding portion sent in the call-up message. Upon failure of the verification, the supervising program initiates a new call-up to the guardian center. The guardian center stores the last received call-up message and the last sent continuation message and associates the stored messages with the tag table identifier value. Upon receiving a call-up message from the supervising program, the guardian center sends the stored continuation message upon verifying that the received call-up message equals the stored call-up message.

Upon failure of the verification, the guardian center may send a digitally signed message to the calling supervising program indicating the failure. Upon receiving the digitally signed message from the guardian center, the supervising program invalidates the tag table.

Upon failure of the verification, the guardian center rejects future call-ups including the tag table identifier value.

The supervising program replaces within the tag table the hash function value of the tag table sent in the previous call-up message by the hash function value of the tag table sent in the current call-up message. The supervising program replaces within the tag table the continuation message received in the previous call-up by the continuation message received in the current call-up.

The call-up to a guardian center may occur each time an operating system and the supervising program are loaded into memory in the user device.

The supervising program measures the time elapsed between a first call-up to a guardian center and a second call-up to a guardian center, by use of one or more event counters. The event counters are updated periodically as recorded by a clock. The guardian center stores a current time value in the continuation message and the supervising program sets an event counter to the current time received in said continuation message.

User device descriptive values may be stored in the tag table. The supervising program stores a plurality of tag tables. The tag tables include the tag table identifier value of the tag table whose hash function values were sent to the guardian center in a plurality of most recent call-ups. The guardian center stores a plurality of the hash function values of the tag tables received in the plurality of the most recent call-ups, in the continuation message. Upon receiving the continuation message, the supervising program, computes the hash function values of the stored plurality of tag tables and further verifies that the hash function values are equal to the corresponding values in the continuation message. The supervising program checks whether the user device descriptive values in the tag tables sent in the plurality of most recent call-ups belong to a plurality of user devices and searches the plurality of tag tables for two successive tag tables including user device descriptive values which differ by more than a specified number of corresponding values. The supervising program checks by searching the plurality of tag tables for a first tag table, a second tag table and a third tag table. The second tag table was sent in a call-up that occurred later than the call-up in which the first tag table was sent. The third tag table was sent in a call-up that occurred later than the call-up in which the second tag table was sent. The user device descriptive values stored in the first tag table and in the second table differ in more than a specified number of corresponding values and the user device descriptive values stored in the first tag table and in the third tag table differ in fewer than specified number of a corresponding values. The supervising program forwards the result of the verification to the guardian center and said guardian center disables future call-up messages including the tag table identifier value upon determining that the tag tables sent in the plurality of most recent call-ups belong to a plurality of user devices. The call-up message includes a new randomly chosen value occurring only once. The continuation message includes a superfingerprint.

The guardian center computes a hash function value of a portion of superfingerprints included in continuation messages sent to the supervising program in previous call-ups and in the continuation message. The guardian center stores the hash function value in the continuation message forwarded to the supervising program. The supervising program verifies that a hash function value of a corresponding portion of the superfingerprints stored on that user device and included in the continuation message is equal to the received hash function value. The supervising program appends the new superfingerprint to the superfingerprints stored on the user device. The call-up message includes the current time on the user device. The guardian center may also verify that the received time is within a specified tolerance of the clock time on the guardian center, and that the time difference between the arrival of the sent call-up message and the previous call-up message exceeds a specified maximum or that the time difference between the arrival of the sent call-up message and the previous call-up message is below a specified minimum.

Upon receiving the continuation message, the supervising program verifies that the total usage measured across all items in the current tag table exceeds the total usage measured across all items in the tag table sent associated with the previous call-up message.

A user device including user device descriptive values and a supervising program is presented. The supervising device records the user device descriptive values.

The user device descriptive values can include processor-identifying information, non-volatile storage device-identifying information, directory structure identifying information or file identifying information.

A software checker including a superfingerprint, a guardian center and a supervising program is presented. The superfingerprint includes data and a computer program. The guardian center sends a plurality of superfingerprints for a copy of software to a user device. The user device stores a plurality of superfingerprints. The supervising program executes in the user device.

The superfingerprint may include a copy of software name, the copy of software name indicating the copy of software to be checked. The superfingerprint may include a weight which determines the frequency of use of the superfingerprint for checking the copy of software. The superfingerprint may include a list of hash function values of portions of a copy of software and a hash function. The superfingerprint may include a decryption program. The superfingerprint may include a monitoring program which monitors the behavioral characteristics of a copy of software. The superfingerprint may include a public key of a vendor associated with the copy of software.

The guardian center sends the superfingerprint in a digitally signed message to the supervising program. The supervising program verifies the digital signature and stores the superfingerprint if the verification is successful.

A method for examining a copy of software used in a user device is presented. A plurality of superfingerprints are presented. Each superfingerprint including a value, a program, a condition, and location information. The program is executed on a portion of the copy of software. The portion is dependent on the location information, of the contents of the copy of software and the value. The computed value and the included value are verified to determine if they satisfy the condition.

A weight may be stored in the superfingerprint. The superfingerprint to test is selected dependent on the weight. At least one tag is presented. The tag is digitally signed by a vendor. The tag associated with the copy of software used in a user device is verified.

Punitive action may be taken upon the successful verification of the condition and the failure of the verification of the associated tag. Alternatively, punitive action may be taken upon the successful verification of the condition and the absence of any tag on the user device. The associated tag may include the name of the copy of software or a hash function value of a portion of the copy of software.

The program may includes a hash function, the value is a list of hash function values, and verifying of the condition further comprises general-location hash function value checking.

The program may be a hash function, the value is a list of hash function values, and verifying the condition further comprises same-location hash function value checking.

The program may monitor behavior of a used copy of software, the value includes a list of actions, and verifying the condition further comprises comparing the monitored behavior against the list.

The program may evaluates intermediate results produced by software, the value includes a list of results, and verifying the condition further comprises comparing the evaluated intermediate results with the list.

The copy of software may be a computer program and the location information specifies a sequence of counts of bytes starting at the beginning of the computer program.

The copy of software may be a computer program and the value is a list including an instruction. No-operation instructions may be excluded from the counts. The location information in the superfingerprints may exclude certain portions of instructions. The excluded portions of instructions may comprise memory locations or register locations.

A method for examining a copy of software used in a user device is presented. A superfingerprint is presented. The superfingerprint includes a program using the copy of software. The program tracks the copy of software and records data related to the use.

A method for allowing use of a copy of software having a tag on a user device is presented. The tag is obtained from a tag table in the user device. A hash function value of a portion of the copy of software is computed. The computed hash function value is compared with a hash function value stored in the tag. Use of the copy of software is allowed upon successful verification of equality of the values. The comparison may further comprise checking that the use of the copy of software is allowed by comparing the use with a usage policy stored in the tag and the verification comprises success of check. The comparison further includes comparing a tag table identifier value included in the tag with a tag table identifier value for the tag table. Allowing use of the software includes recording usage statistics for the copy of software.

A superfingerprint stored in the user device is checked for a match with the copy of software. Upon detecting a match, a vendor name and a public key included in the superfingerprint are verified to be equal to a vendor name and a public key included in the tag. Upon failure of the verification, the use of the copy of software is disallowed.

A superfingerprint stored in the user device is checked for a match with the copy of software. Upon detecting no match, the use of the copy of software is allowed.

A method for supervising use of software on a user device is presented. A tag table is provided in the user device. The tag table includes a tag table identifier value. The user device sends a call-up message to a guardian center. The call-up message includes the tag table identifier value. The guardian center verifies that the difference between the time of the call-up message and the time of a last call-up message including the tag table identifier value exceeds a specified minimum value.

Upon successful verification, the guardian center generates a digitally signed continuation message. The digitally signed continuation message includes the call-up message. The guardian center stores the call-up message and sends the digitally signed continuation message to the user device. The guardian center verifies by computing a difference between a time as recorded on the user device included in the call-up message and the time as recorded in the guardian center.

The digitally signed continuation message sent by the guardian center includes a hash function value of a portion of superfingerprints previously sent by the guardian center in response to a call-up message including the tag table identifier value. The continuation message includes a new superfingerprint provided by the guardian center. The user device verifies the signature of the guardian center and the tag table identifier value included in the continuation message.

A user device time as recorded on the user device is stored in the call-up message. The time is stored in the continuation message and the time is verified to be earlier than by less than a specified value from the user device time upon receiving the continuation message.

The user device verifies that the hash function value of the portion of previously sent superfingerprints stored in the user device is equal to the hash function value included in the continuation message.

The digitally signed continuation message sent by the guardian center further includes a hash function value of a portion of the superfingerprints previously sent by the guardian center in response to a call-up message including the tag table identifier value and a superfingerprint sent in the continuation message. The user device verifies that the hash function value of the portion of previously superfingerprints sent by the guardian center and stored in the user device is equal to the hash function value included in the continuation message.

The user device installs a new superfingerprint in the tag table.

A method for ensuring that a user-specified user device identifier value is present on only one user device is presented. A message is sent from the user device to a receiver. The message includes the device identifier value associated with the user device. The receiver searches a data structure associated with each possible user device identifier value. An ID-checking procedure determines whether the user device identifier value is stored on another user device. Upon determining that a user device identifier value is on a plurality of user devices, the receiver invalidates the user device identifier value.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

According to the present invention, use of a copy of software occurs on a user device enabling the use. The user device includes and/or is connected to one or more general or special purpose processors. This processor or these processors may share the implementation of the use of a copy of software as well as the implementation of all the protection mechanisms of the present invention.

Figure 1:
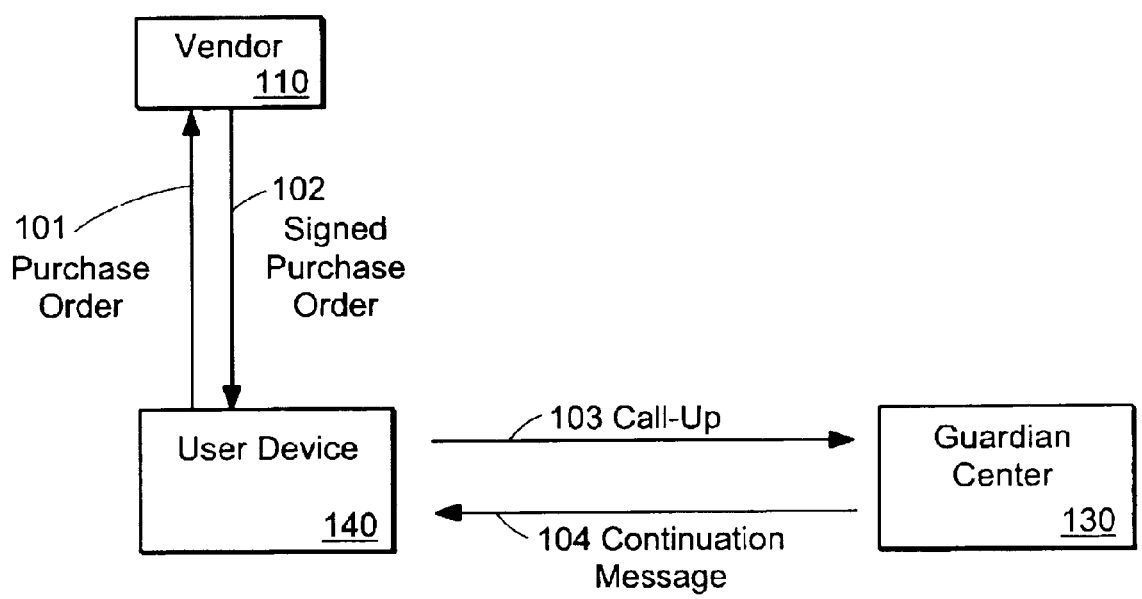
FIG. 1 illustrates a system for protecting information and privacy, system including, a Vendor, a Guardian Center and a User Device.

FIG. 1 illustrates a system for protecting information and privacy, the system including a Vendor 110, a Guardian Center 130 and a User Device 140. There is a multiplicity of User Devices 140, operated by users who may attempt to pirate software. When a user (not shown) at User Device 140 purchases software, the User Device 140 sends a Purchase Order 101 to a Vendor 110. If the Purchase Order passes certain tests, the vendor 110 signs the Purchase Order and sends the signed Purchase Order 102 back to the User Device 140. The User Device 140 installs the signed Purchase Order 102 and other information as a Tag into a Tag Table. The Tag Table will be described later in conjunction with FIG. 2.

Software is herein construed to be any digital information, including but not limited to, computer programs, text, data, databases, audio, video, images, or any other information capable of being represented digitally or as a signal, the software being accessed by or used on devices such as computers or special purpose devices. Use of a copy of software includes, but is not limited to, reading, displaying, storing, modifying, broadcasting, or executing that software.

Periodically, the User Device 140 issues a Call-Up 103 in which it sends information to the Guardian Center ("GC") 130. If the information sent to the Guardian Center 130 in the Call-Up 103 passes certain tests to be described later, then the Guardian Center 130 sends a Continuation Message 104 back to the User Device. The received Continuation Message 104 is employed in the User Device 140 to generate further tests during and after the Call-Up 103 to prevent use of copies of software infringing on rights of legitimate Vendors in the User Device 140. The detailed structure of Tags, the Call-Up message 103, the tests performed by the GC 130 and the User Device 140, and the contents of the Continuation message, are described later. In the present invention, whenever the term message is used, it should be understood that the message can be sent in parts and that every signed message can be sent in parts with the parts separately signed.

Figure 2:
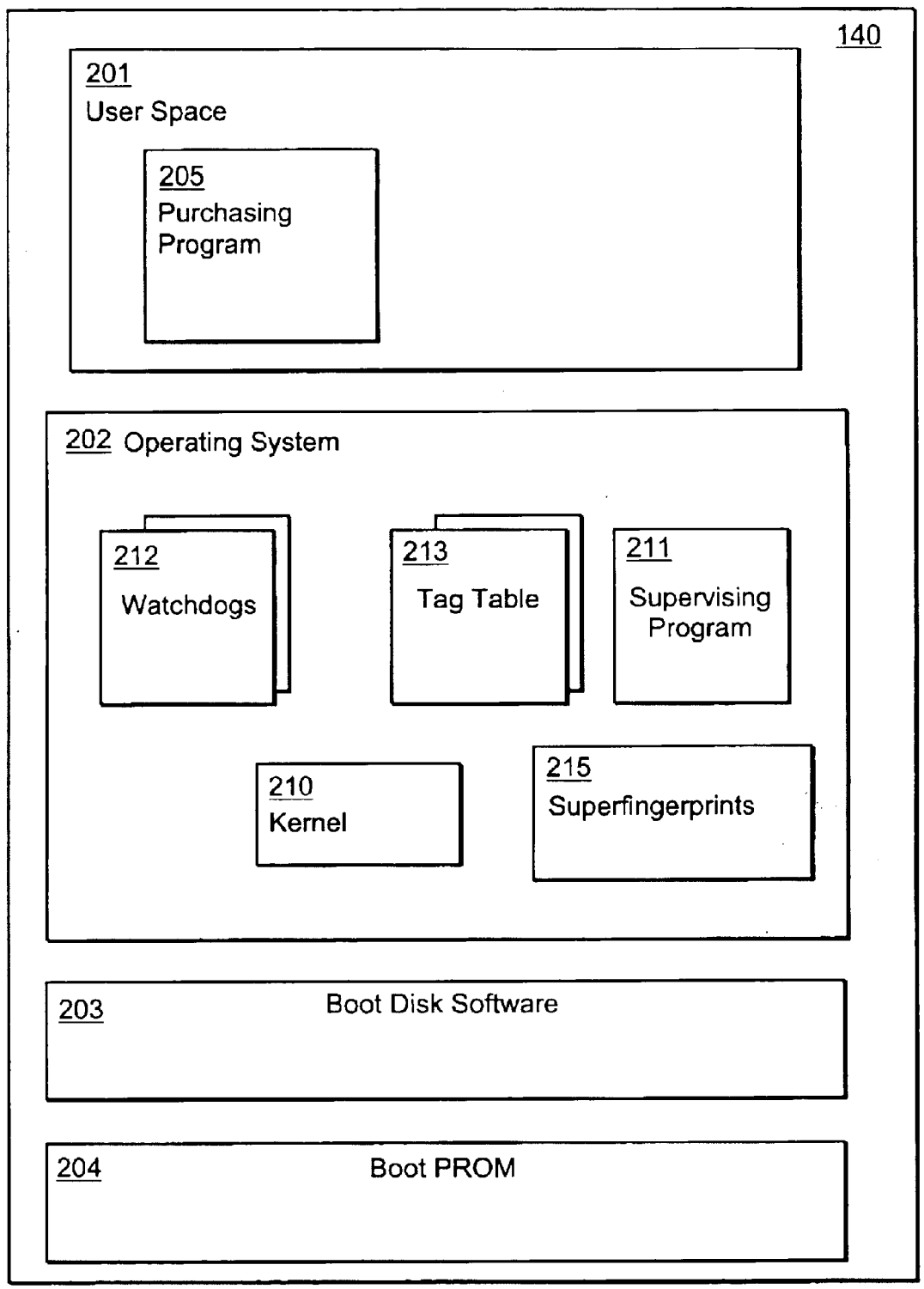
FIG. 2 illustrates the software architecture of the User Device shown in FIG. 1 including a User Space, an operating system, a boot disk and a boot Programmable Read Only Memory.

FIG. 2 illustrates the software architecture of the User Device 140 shown in FIG. 1. The User Device 160 is a system including a User Space 201, an operating system 202, a Boot Disk Software 203 and a Boot Programmable Read Only Memory ("PROM") 204. FIG. 2 also illustrates components included in the operating system 202. The Supervising Program 211 is shown to be part of the operating system 202, though this is not strictly necessary. Similarly, the Watchdogs 212 are also shown in the operating system 212. However, the Watchdogs 212 may also be in User Space 201. The User Space 201 can be modified freely by the user. In one embodiment of the invention, the operating system 202 further includes one or more Tag Tables 213 and a collection of Superfingerprints 215. In an alternative embodiment of the invention, the Tag Tables 213 and/or the Superfingerprints 215 are stored in User Space 201. The operating system 202 cannot normally be modified, though pirates may try to do so by using "patches". A patch is a replacement of machine language code. The patch can be a new device driver, a section of a device driver or operating system kernel based on User commands. The invention includes mechanisms to eliminate the danger of patches. The Boot PROM 204 loads the Boot Disk Software 203. The Boot Disk Software 203 is responsible for loading the operating system 202.

Within the operating system 202, there is a kernel 210 that performs various functions such as scheduling processes, controlling the file system, (not shown) and other activities. The Supervising Program 211 verifies that a copy of software used on a User Device 140 is legitimate by comparing fields in a Tag stored in the Tag Table 213 with the copy of software, as explained in co-pending U.S. patent application Ser. No. 09/305,572 filed May 5, 1999, entitled "Methods and Apparatus for Privacy Information" by Michael O Rabin, et. al., which is incorporated herein by reference in its entirety, and by performing Superfingerprint checks which are described later. A Supervising Program 211 is a program integrated into a User Device 140. The Supervising Program 211 provides the mechanisms described hereunder which implement usage supervision for copies of software used on the User Device 140. The Supervising Program 211 is part of the operating system 202. This is not mandatory as noted above, provided that the integrity of the Supervising Program 211 can be ensured for example, by a Watchdog 212, and it is capable of performing the functions described herein. The would-be software pirate has no control over the Vendor 110 (FIG. 1) or the Guardian Center 130 (FIG. 1) which are wholly owned by the protection against piracy system. But the pirate may try to change the User Device 140 in order to circumvent the protection. The protection system's components within the User Device 140 include the Supervising Program 211, the Tag Table 213 and the Watchdogs 212.

Since protection against piracy mechanisms involve some monitoring and control of the behavior of the User Device 140, a concern arises that the User's privacy and possibly some freedoms of action may be impinged upon. The present invention provides several mechanisms to ensure that a User's privacy is not impinged upon. At the same time, the present invention prevents a User Device 140 from using pirated software and from using legitimately purchased or rented software not in accordance with purchase or rental agreements, but imposes no other limitation on a User Device 140.

One or more Watchdogs 212 ensure that modules of the operating system 202 including the Supervising Program 211 have not been modified. One or more Watchdogs 212 are dispersed throughout the operating system 202. The Watchdogs 212 check other portions of the operating system 202. Watchdogs 212 are discussed later.

In one embodiment of the present invention, the methods described in relation to the conforming load of software modules are also employed during use of the loaded software modules. In another embodiment, the methods can be employed by a dedicated processor that periodically checks each link using hash function value matching or Stub Checking. This dedicated processor may have one or more public keys etched into its hardware as does the Boot PROM 204 above.

Protecting the Integrity of the Operating System Upon Loading: Conforming Load

The present invention provides mechanisms for ensuring that a copy of software stored in a User Device's memory is authorized software. A presumed copy of a Vendor's software is authorized if it is identical to the software originally produced by the Vendor. Usually the copy of software is loaded into memory from a secondary storage device or from a remote location. A load into memory that results in an authorized copy is herein called a conforming load of a copy of software. A conforming load of a software module results in a conformant software module; that is, an authorized copy of the software module stored in memory. In this section mechanisms for effecting a conforming load of an operating systems or portions thereof are described. However, these mechanisms are not limited to a conforming load of an operating system, these mechanisms apply to ensure the conforming load of any software.

Figure 3:
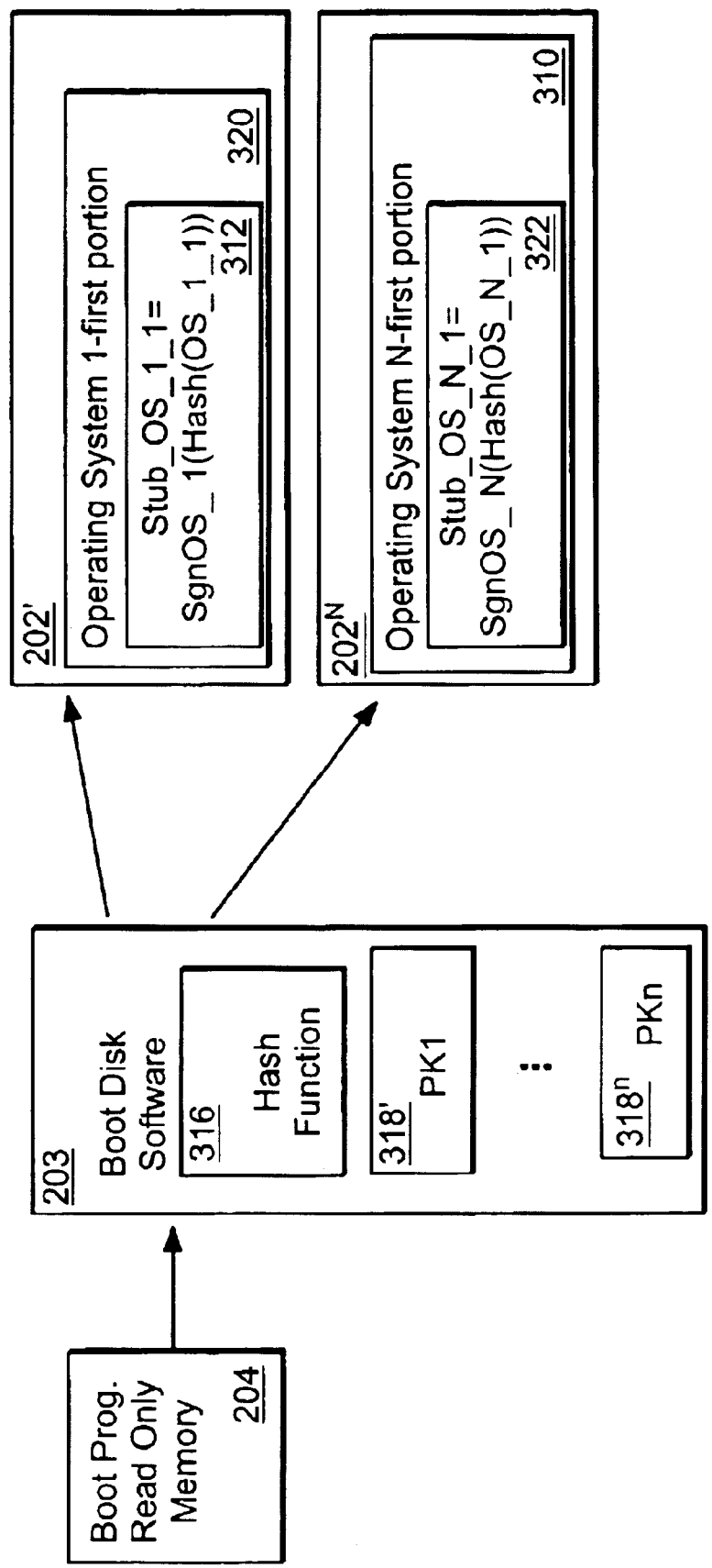
FIG. 3 illustrates components used in the load procedure according to an embodiment of the present invention.

FIG. 3 illustrates components of the load procedure for an operating system 202 according to an embodiment of the present invention. The explanation of the various components and their function is described later. The load procedure includes a method called Linked Protection which performs a conforming load of one of a plurality of operating systems $202^1$, $202^N$. The Linked Protection method is not limited to performing a conforming load of an operating system $202^1$, $202^N$, the method also applies to a conforming load of any other software.

The initial segment or module of the boot program is stored in a Programmable Read-Only Memory (PROM) 204, present within, or attached, to the User Device 140. The initial segment may also be stored in other similar storage devices, such as a non-modifiable portion of flash memory or in a processor. The boot program is the software employed to "boot"; that is, start, a User Device 140 by loading an operating system 202, or appropriate portions thereof, into memory. A PROM 204 is a storage device that holds data or program text that can be written once and subsequently only read. According to current technology, a PROM is considered to be difficult to modify by software means in the sense that no generally available software program can be employed on a user device 140 to modify the contents of the PROM. Such modification can be implemented only by use of special hardware that must be attached to the user device 140.

The boot PROM 204 stores the software for implementing the initial stages of the boot operation. The boot operation includes preparation of the User Device 140 for operation by loading an operating system or portions thereof. The boot disk software 203 stores further software used in the boot operation and is loaded into memory from a local or remote storage device (not shown). Subsequently, portions of one or more operating systems $202^1$ and $202^N$ are loaded if their contents pass certain tests which will be described later. A portion of an operating system or a copy of software, refers to all of the text or data of that instance, or to a sequence of parts of the text or data of the copy of software. The parts need not be contiguous and may overlap with one another.

A conforming load may be performed by hash function value matching, by Stub checking, or by any combination of hash function value matching and stub checking. A software module is a portion of a copy of software. A conforming load of a software module p2 by hash function value matching is effected by use of a conformant software module p1, already in memory. Module p1 contains at least one hash function value computed by means of a publicly known hash function (or in an alternative embodiment, computed by means of a hash function specified in p1). The authentication of module p2 involves computing the hash function value of p2, or of specified portions of p2, by the hash function and comparing the thus obtained value or values with at least one hash function value present in p1. Only if the two values agree, are the load of p2, and the continuation of the boot operation, allowed.

Stub Checking is another method used to ensure that a software module p2 loaded and stored in memory, is a conformant; that is, authorized, software module. Stub Checking uses a stub digitally signed by a software manufacturer or by some other authority within the system of the present invention. The digitally signed stub is attached to the software module p2, and includes sufficient information to uniquely identify the contents of the software module. The digital signature on the stub is verified by use of a public key present in a software module p1 already conformingly loaded, or else stored in a PROM or other non-modifiable memory within or attached to the User Device. In one embodiment, the sufficient information is a hash function value of the contents of the software module p2. The Stub Checking procedure involves computing the identifying information for the software module p2 which is to be loaded, comparing the computed information with the information present in the Stub attached to p2, and verifying the digital signature on the Stub by use of a public key present in the above mentioned conformant software module p1. In the case of hash function value matching and Stub Checking, the verification is successful if all value comparisons show equality, and all digital signature verifications have authenticated the claimed signatures.

Conforming load by Stub Checking allows flexibility in extending or modifying authorized software systems. That is, since the conformant software module p1 contains the public key required for verifying the Manufacturer's or Vendor's digital signature, the Manufacturer or Vendor can at any time create a new version of a next or subsequent software module p2 with an authorizing stub signed by the Manufacturer or Vendor. The new version p2, and the new software modules can be conformingly loaded by stub checking, using the public key in p1. A conforming load by hash function value matching is usually faster than a conforming load by stub checking. It does not, however, provide the flexibility and extensibility provided by the use of stub checking.

Figure 4:
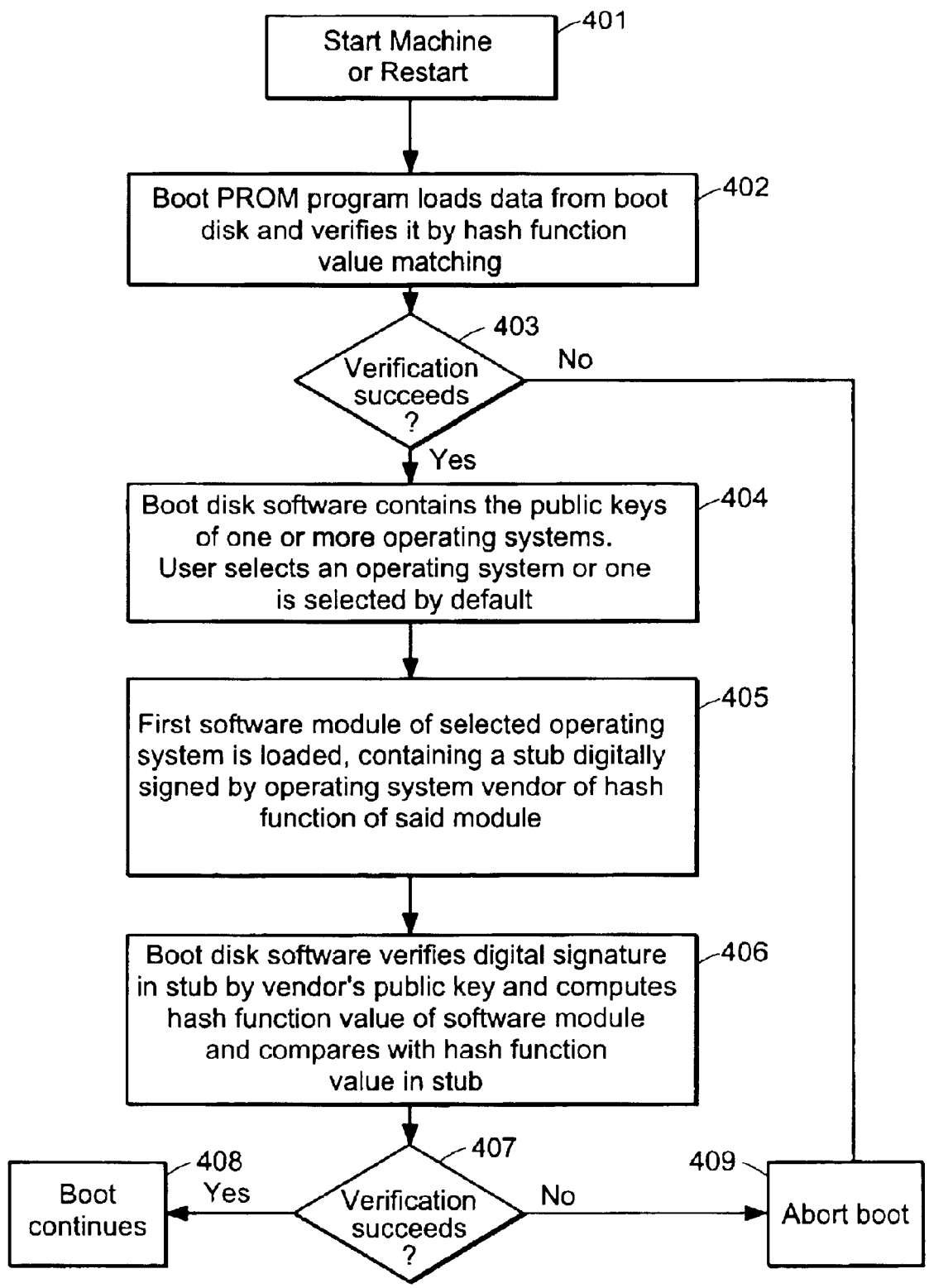
FIG. 4 is a flow chart illustrating the steps for performing a conforming load of part of the operating system.

FIG. 4 is a flowchart illustrating the initial steps for performing a conforming load of the Operating System. FIG. 4 is described in conjunction with FIG. 3.

At step 401, the User Device 140 or computer system is started or restarted. Processing continues with step 402.

At step 402, the software stored in the Boot Programmable Read-Only Memory 204 performs a conforming load of data from the Boot Disk Software 203 into memory (not shown), by use of hash function value matching dependent on a stored hash function 316. In another embodiment of the present invention, the Boot program stored in the PROM 210 also contains a plurality of public keys $318^1$–$318^N$ one or more of which is used to implement the conforming load of the Boot Disk Software 203 by Stub Checking. To perform a conforming load of software, the Boot program stored in the PROM 204 ensures that a software module transferred (loaded) to computer memory is an authorized software module. An authorized software module provided by a system or application software Vendor, is a copy of the software module that is identical to the software module originally produced by the Vendor 110.

The Boot Disk Software 203 includes a plurality of Public Keys $318^1$–$318^N$, each key to be used in the conforming load of an existing or future operating system $202^1$–$202^N$. In addition, the Boot Disk Program 203 can contain a plurality of hash function values 316, each to be used in the conforming load of an existing operating system $202^1$–$202^N$, or other existing software module, by hash function value matching. The Private Keys corresponding to the Public Keys $318^1$–$318^N$ are held by a plurality of software Vendors 110 and/or are kept in safe escrow. A private key is used by a Vendor 10 to create an authenticating stub attached to a software module or system. The corresponding public key $318^1$–$318^N$ is used by a recipient of the software to perform a conforming load of the software by Stub Checking. Processing continues with step 403.

At step 403 the Boot PROM program determines if verification by hash function value matching has succeeded. If so, processing continues with step 404. If not, processing continues with step 409.

At step 404, once the conforming load of the Boot Disk Software 203 (FIG. 3) into memory has fully or partly occurred, the software offers the user of the User Device 140 a choice to select from one or more operating systems $202^1$–$202^N$, or else selects by default a preset previously selected operating system $202^1$–$202^N$. Processing continues with step 405.

At step 405, a module of the selected operating system software, for example, Operating System N 202N, is read into memory. If the module is denoted OS_N_1 310 and has a Stub 322 signed by the private key of the operating system vendor OS_N, in one embodiment, the Stub 322 has the form Stub_OS_N_1=SGN_OS_N(HASH(OS_N_1)). SGN_OS_N is the public key digital signature function associated with the operating system OS_N $202^N$. HASH is a hash function 316 specified in the Boot Disk Software 203. Processing continues with step 406.

At step 406, the Boot Disk Software 203, (FIG. 3) computes the hash function value HASH(OS_N_1) on the first module OS_N_1 310 of OS_N $202^N$ loaded into memory. Call the resulting hash function value H. Using the public key PK_N 318 associated with the operating system OS_N $202^N$, stored in the Boot Disk Software 203, the Boot Disk Software 203 applies the public key to H to verify the signature value SGN_OS_N(H) read from the Stub 322 associated with the first module OS_N_1 310. Processing continues with step 407.

At step 407, the Boot Disk Software 203 checks to see if the verification succeeds.

If so, processing continues with step 408. Otherwise, processing continues with step 409.

At step 408, the first phase of the Boot operation is successful. Whether the User Device 140 is now ready to be used depends on the specific operating system OS_N $202^N$. For some operating systems, further modules need to be loaded for rendering the device usable. The conforming load of possible subsequent modules (not shown) of OS_N 310 is performed by OS_N 302N by Conformance Checking. Conformance Checking employs hash function value matching and Stub Checking. By mixing hash function value matching and Stub Checking in the design of a software system comprising numerous software modules, the speed and extensibility benefits of both methods can be achieved. The software modules of OS_N 320 include a plurality of public keys PK_N_1, PK_N_2, . . . , and a plurality of hash function values H_1, H_2, . . . Let the next module of OS_N to be loaded be OS_N_1_5, the module being chosen by the user, or by OS_N_1. The conforming load of OS_N_15 is performed either by Stub Checking using a Stub attached to the software module OS_N_1_5 and one of the above mentioned public keys present in the already loaded conformant OS_N_I, or by hash function value matching using the one of the above mentioned hash function values present in OS_N_1. In another embodiment of the invention, some of the public keys and the hash function values employed in conforming loads of software modules, can be present in the Boot PROM program or the Boot Disk Program.

At step 409 the boot procedure is aborted.

The above process of conforming load of software modules can be repeated a number of times, where each additional module of OS_N is loaded by use of conformance checking, employing a public key or a hash function value present in a previously loaded conformant module.

Thus, the Boot Disk Software 203 (FIG. 3) is authorized because of hash function value matching with respect to the Boot PROM 204 (FIG. 3). Each subsequent module of the operating system is authorized based on conformance checking performed by a previously authorized module of the operating system. For each operating system $202^1$–$202^N$, the operating system Vendor 110 retains the flexibility of changing any or all modules of the operating system $202^1$–$202^N$, allowing conforming loads of the modules by use of conformance checking employing embedded public keys $318^1$–$318^N$, Stubs, hash functions, and/or hash function values in the modules.

Only the operating system Vendor can produce versions of modules of an operating system that can be loaded in a conforming manner because only the Vendor possesses the private key P_K_N necessary for computing the digital signature function SGN_OS_N( ) employed in the conforming load. A private key is a private secret key used by the Vendor for producing digital signatures. If a new Vendor wishes to distribute new operating system software, the new Vendor is assigned one of the as yet unused public keys present in the Boot Disk Software 203 (FIG. 3). The private key corresponding to the public key is held in trusted escrow until required and is securely given to the new Vendor. Efficiency considerations determine whether to use Stub Checking or hash function value matching for conformance checking for any given module of the Vendor's operating system.

In an alternative embodiment of conforming load, only certain sub-portions of a module to be loaded are specified to be included in the hash function value calculation. This allows the operating system Vendor the freedom to change certain portions of an operating system from time to time, without disrupting the conforming load of the module. An example of such a changeable portion is a data area.

A generalization of the above process for the conforming load of an operating system, allows the conforming load of any software or data (in general, text). In this generalization, the Boot PROM 204 and the data stored therein are replaced by any data and/or program code that is authorized by a trusted party. The other modules may be modules of arbitrary software broadly construed in the sense of the present invention.

Figure 5:
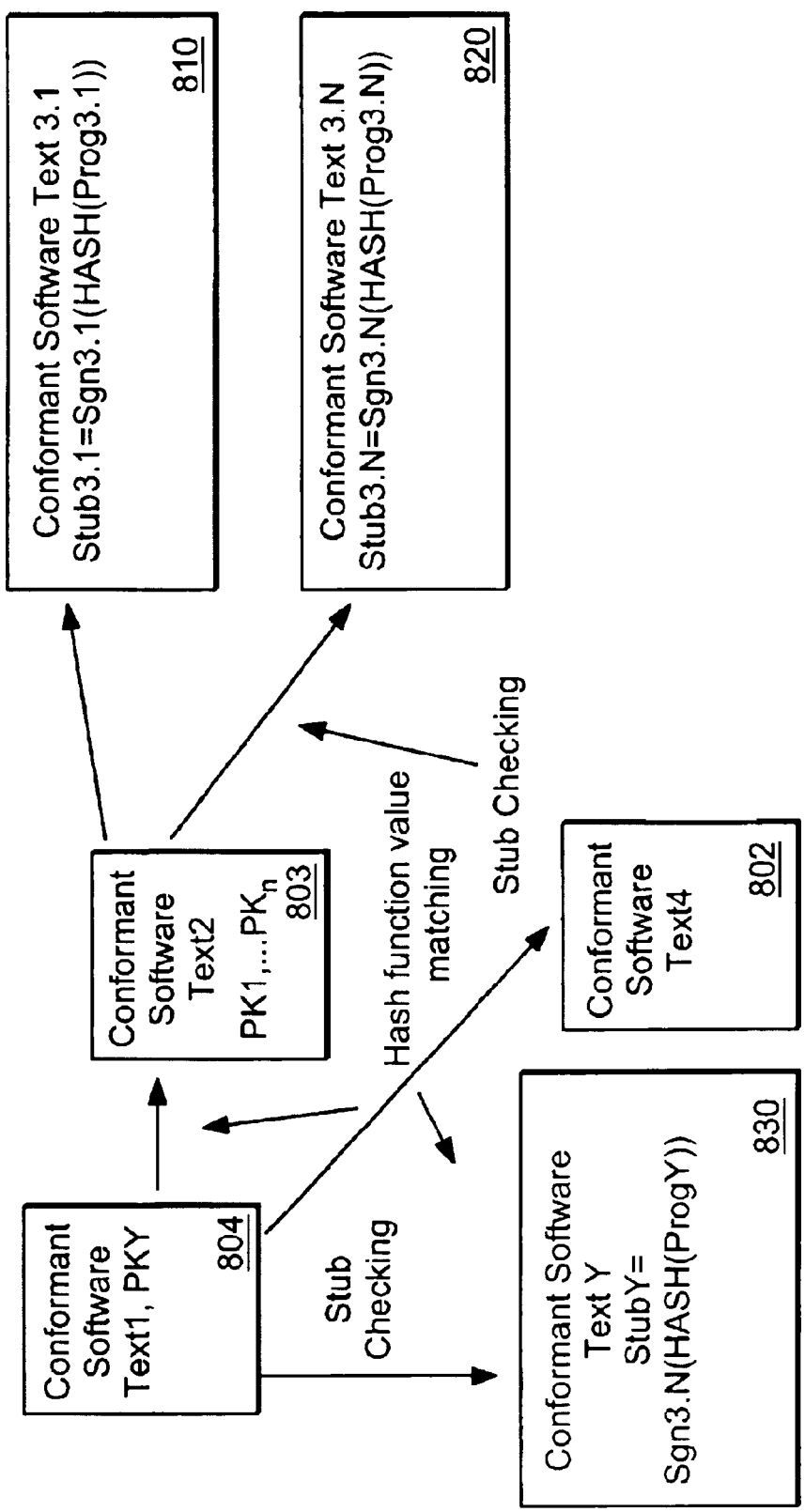
FIG. 5 illustrates the components for performing the conforming load procedure for some software other than the operating system.

FIG. 5 illustrates the components of a conforming load procedure for some software that need not be the operating system. The root portion of text is stored in module 804. The root portion is text whose conformance is initially assured. Linking from module 804 may be done by hash function value matching or Stub Checking. The programs required for performing the hash function value matching or the Stub Checking are present in software that has been previously loaded using conforming loading. As shown, hash function value matching is used for text stored in modules 803 and 802 and Stub Checking is used for text stored in module 830. Module 803 uses Stub Checking for text stored in modules 810 and 820. Thus, module 804 may use hash function value matching for some text and Stub Checking for other text. The software modules loaded subsequently to module 804 are each conformingly loaded by use of hash function values or public keys present in previously loaded conformant software modules.

A further generalization of the above method employs a protocol in which a module M is loaded only after conformance checking has taken place using a plurality of Stubs and/or hash function values in a plurality of previously loaded modules (not shown). For example, module M1 can have a public key P1 and there can be a Stub associated with M that is signed by the owner of P1. In addition, module M2 can have a hash function value H2. Both of these are used for a conforming load of module M.

The methods described in relation to the conforming load of software modules can also be employed during use of the loaded software modules. For example, the methods can be employed by a dedicated processor that periodically checks each link using hash function value matching or Stub Checking.

Protecting the Integrity of the Operating System While Running: Watchdog Protection Even after software has been loaded using conforming loading, it is important to extend the assurance that software is authorized throughout the period of the software's execution on the User Device 140 while it is stored in memory. Two possible attacks against some currently deployed operating systems involve forcing a buffer overflow during a system call, or installing an improper kernel-level driver.

Watchdog Protection provides enhanced security. Watchdog protection includes Watchdogs 212 and Watchdog checks. A Watchdog 212 is program code and data embedded, preferably in a hard-to-detect manner, within a software module.

Figure 6A:
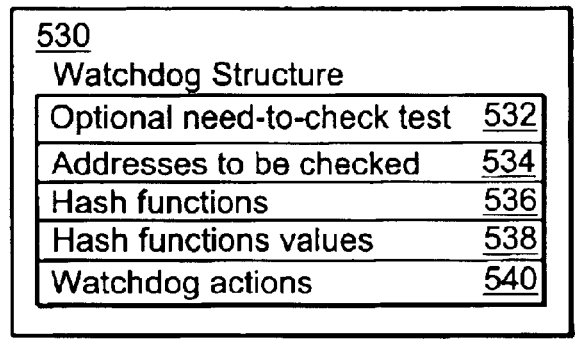
FIG. 6A illustrates a Watchdog structure.

FIG. 6A illustrates a Watchdog structure 530. A Watchdog structure 530 includes a sequence of not necessarily consecutive addresses to check 534, a plurality of hash functions to use on the contents of those addresses 536, and a plurality of hash function values 538. Addresses to be checked 534 may include absolute memory locations, relative memory locations, and file names. The Watchdog structure 530 also includes an optional need to check test 532 and Watchdog actions 530.

Figure 6B:
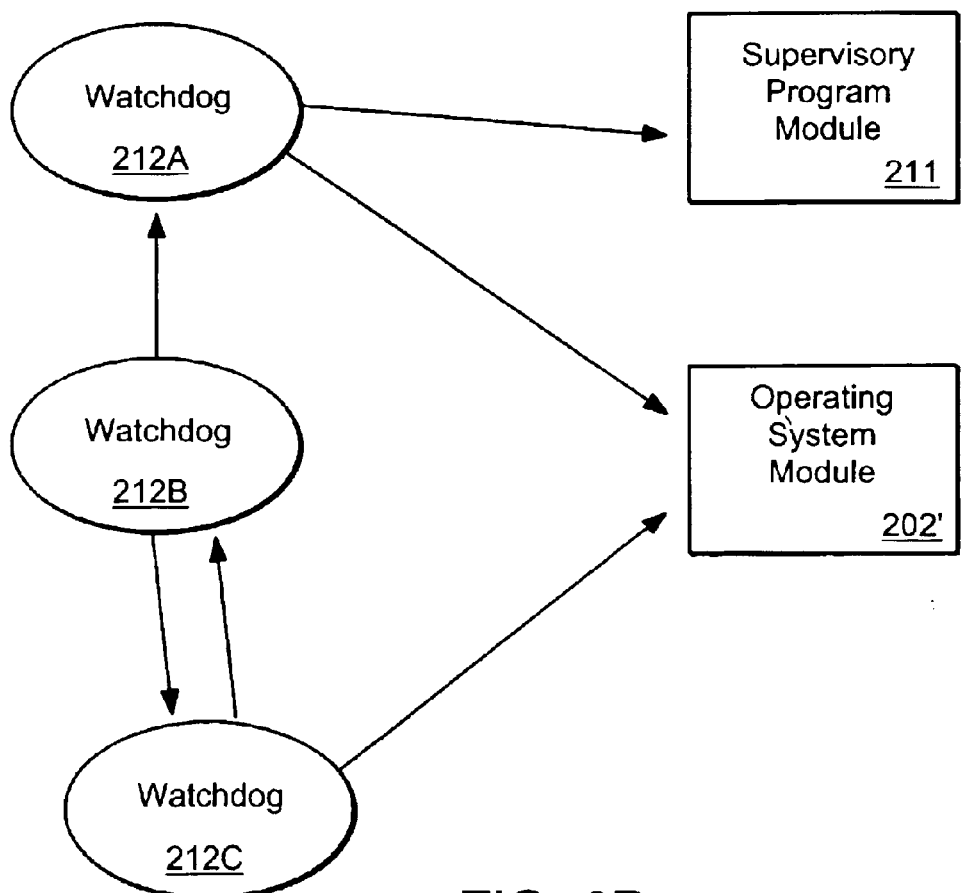
FIG. 6B illustrates Watchdog protection for modules of the operating system 202 and Supervising Program.

FIG. 6B illustrates Watchdog protection for modules of the operating system 202 and Supervising Program 211. However, Watchdog Protection is not limited to the Operating System, Watchdogs 212a–c can be used to protect the integrity of any program, including User application programs.

The Checking relationships scheme described in conjunction with FIG. 6B can be readily generalized to software systems containing any number of software modules, Watchdogs, and Checking relationships.

Three Watchdogs 212a–c are shown in FIG. 6B. Watchdogs 212a–c mutually check one another and check module 202[1] of the operating system 202 (FIG. 2) and module 520 of the Supervising Program 211 (FIG. 2) to detect whether any of these modules has been modified. Each arrow from a Watchdog 212a–c indicates a Checking relationship, thus a Watchdog may check more than one software module. As shown in FIG. 6B, Watchdog 212a checks software modules 510 and 520. Also Watchdogs may check each other. As shown in FIG. 6B, Watchdogs 212b and 212c check each other.

Figure 6C:
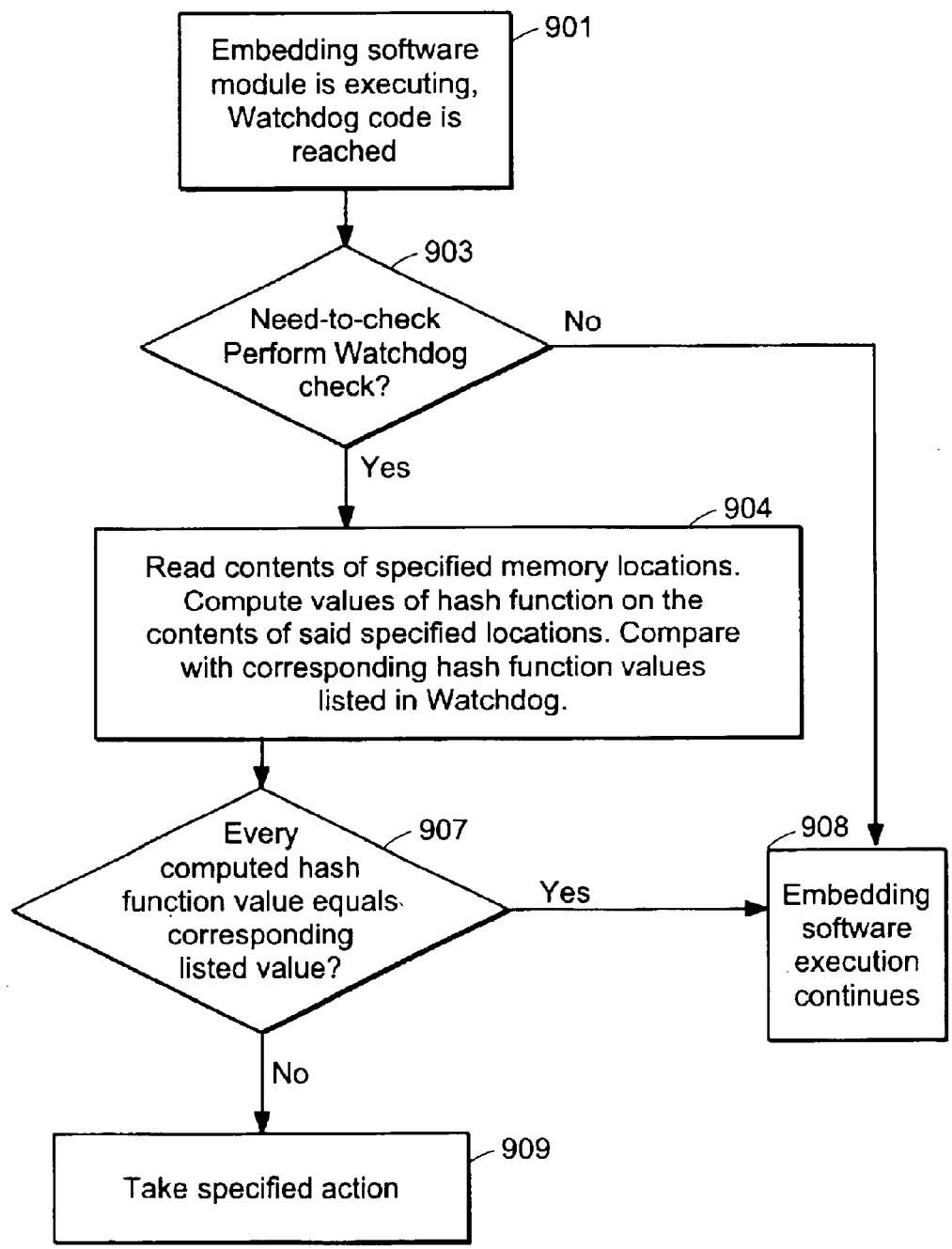
FIG. 6C is a flowchart illustrating the steps for a Watchdog to check contents of specified memory locations.

FIG. 6C is a flowchart illustrating the steps for a Watchdog to check contents of specified memory locations. FIG. 6C is described in conjunction with FIGS. 6A–6B.

Watchdogs may, as shown in FIG. 6B, check a plurality of portions of code. The procedure described in FIG. 6C is repeated for each such check.

At step 901, a software module is executed. When Watchdog code is reached processing continues with step 903.

At step 903, the Watchdog Protocol executes the Need-To-Check Test 532 (FIG. 6A) to determine, based on conditions specified in the Watchdog code, which addresses, if any, should be checked by the Watchdog 211. One possibility is that every time the Watchdog code is reached, all addresses to be checked 534 listed in the Watchdog structure 530 are checked. If the Need-to-check test determines the Watchdog not be executed processing continues with step 908. For example, a Watchdog 212a–c can perform a check only whenever the value of the device's clock is an even number and a specified memory location has a value within a specified range. An arrangement where Watchdog Checking is infrequent has the advantage that the Watchdog, its location and operation, are less likely to be detected by an adversary.

After the subset of the addresses to be checked 534 are determined by the Need-To-Check Test 532, processing continues with step 904.

At step 904, the contents of the subset of addresses are read and the appropriate hash functions 536 specified in the Watchdog structure 530 (FIG. 6A) are used to compute hash function values on the contents of the addresses. Processing continues with step 907.

At step 907 the resulting values are compared with the appropriate hash function values 538 (FIG. 6A) listed in the Watchdog structure 530 (FIG. 6A). If the values are unequal, processing continues with step 909. If the values are equal processing continues with step 908.

At step 908, embedding software execution continues. In an alternative embodiment, instead of checking that values are equal, a Watchdog 212a–c may check that two memory locations bear some relationship to one another. For example, suppose that some critical procedure takes less than a millisecond. Suppose further that the software writes the time when it begins the procedure in memory location L1 and the time when it ends the procedure in memory location L2. In that case, the Watchdog 212a–c can check that the value in L2 is no more than a few milliseconds greater than the value in L1. Such a Watchdog 212a–c is called a Data Watchdog. Another variant is to detect that some unauthorized code is present. Thus, the steps 904 and 907 may be replaced by other steps that determine whether some specified memory locations have their authorized values.

At step 909, the Watchdog 212a–c determines which actions to take based on its respective Watchdog actions 540 (FIG. 6A). For example, a Watchdog 212a–c designed to detect unauthorized modification of a software module or data module can halt execution of the Embedding software if a specified comparison detects inequality. The actions to be taken upon detection of unauthorized modifications or unauthorized code are specified within the Watchdog code and are called Watchdog actions 540 (FIG. 6A).

In yet another embodiment, Watchdogs 212a–c are further extended to include programs that perform checks other than the matching and comparison checks described above. An example of such a program that can be included in a Watchdog, monitors behavioral characteristics of subprograms of the system software protected by the Watchdog 212a–c and matches the observed characteristics to data included in the Watchdog. An example of behavioral characteristics of software which are specific library and subsystem calls that the program is making, the frequency of such calls and the conditions that trigger these calls. For appropriately selected characteristics, if the monitored behavioral characteristics deviate from data listed in the Watchdog by more than a parameter value listed in the Watchdog, the Watchdog takes a Watchdog action 540.

Another example of a Watchdog action is to insert an error in the executing code that will take effect after the Watchdog Check has completed its execution. The effect can be to halt the execution of the program.

In one embodiment, Watchdog procedures are interspersed with the operating system code in order to escape detection. In an alternative embodiment, the Watchdog procedures may be subroutines that move. The instruction sets of most processors, including the Pentium III produced by Intel Corporation®, contain a subroutine call instruction. This instruction includes the address in memory where a subroutine code begins, referred to as a Called Address. A subroutine is a portion of a program that performs some function and then returns control to the instruction following the subroutine calling instruction.

Similarly, the instruction sets of many processors contains No-Operation ("No-Op") instructions. No-Op instructions, when they execute, do not change the state of the processor. Therefore removing No-Op instructions has no effect on the values produced by a computation.

Figure 6D:
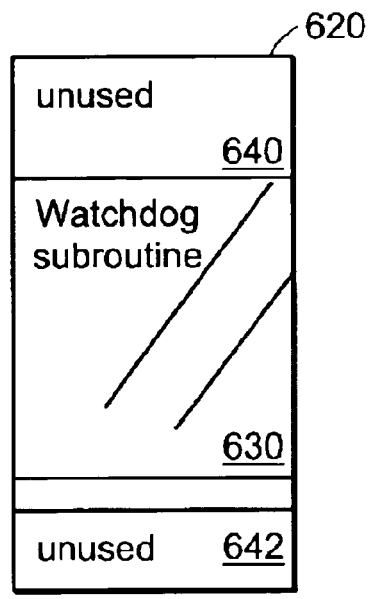
FIG. 6D illustrates a Watchdog field for any one of the Watchdogs shown in FIG. 6B.

FIG. 6D illustrates a Watchdog field 620 for any one of the Watchdogs 212a–c shown in FIG. 6B. A Watchdog Subroutine 630, is placed in a Watchdog Field 620 FIG. 6C that is larger than necessary to fit the Watchdog subroutine 630. For example, if the Watchdog Subroutine 630 requires 100 bytes, the Watchdog Field 620 can be 1000 bytes. At load time, the Watchdog Subroutine 630 is placed in some consecutive sequence of locations in the Watchdog Field 620, for examples (bytes 70 through 169) dependent on conditions present at load time such as the time or the value of some memory location. The other bytes 604, 642 in the Watchdog Field 620 may be No-Ops or may never be executed.

Figure 6E:
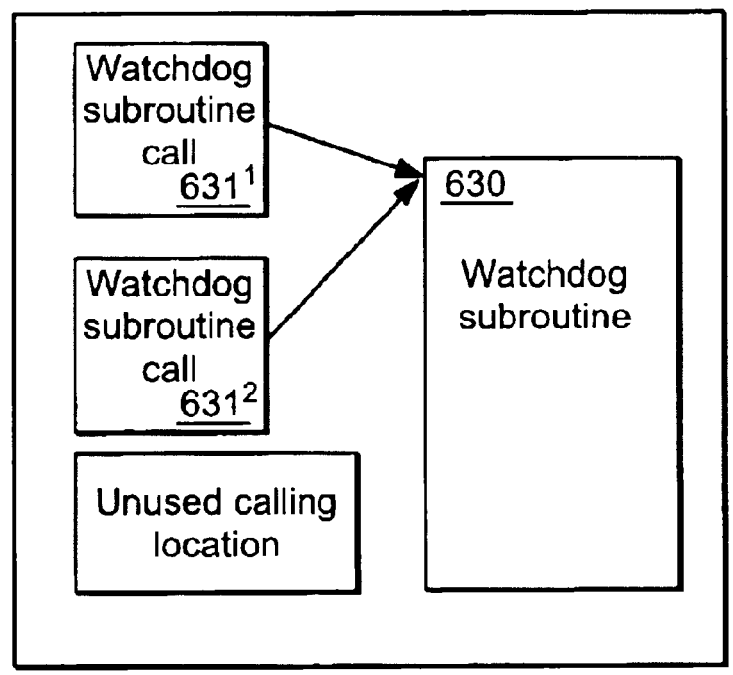
FIG. 6E illustrates the Watchdog subroutine and Watchdog subroutine calls in a program in the User Device.

FIG. 6E illustrates the Watchdog subroutine 630 and Watchdog subroutine calls in a program 202 in the User Device 140. All subroutine calls $631^1$, $631^2$ to the Watchdog Subroutine 630 have their Called Address set at load time to the starting location of the Watchdog Subroutine 630. Because the placement of the Watchdog Subroutine 630 within the Watchdog Field 620 (FIG. 6D) may change from one load to another, the Watchdogs 202a–c are said to "slide." The previously described sliding of Watchdogs 212a–c may also be effected after the operating system 202 and the included Watchdogs 212a–c are loaded. In an alternative embodiment of the invention, a Watchdog may include a program that slides Watchdogs 212a–c and copies Watchdogs 212a–c into available contiguous locations in a Watchdog field 620 (FIG. 6D).

The subroutine calls 631 (FIG. 6D) to the Watchdog Subroutine are placed in a subset of possible locations depending on conditions present at load time. In one embodiment, the set of possible locations contain either subroutine calls $631^1$, $631^2$ or No-Op instructions.

Watchdog programs 212a–c need not be on the user device 140 that is to be checked. In an alternative embodiment, when a user device 140 issues a request to a site, a watchdog program at the site asks that the user device compute a function on a sequence of locations in the user device 140 and then return that value to the site. The site then compares the value returned with the value stored in the watchdog program 212a–c. If the two values disagree, the site sends a message to the user device 140 that said user device's protected program has been compromised. Furthermore, the additional functions performed by a watchdog 212a–c and described above are performed by this embodiment by the watchdog at the site.

Tag Table

Figure 7:
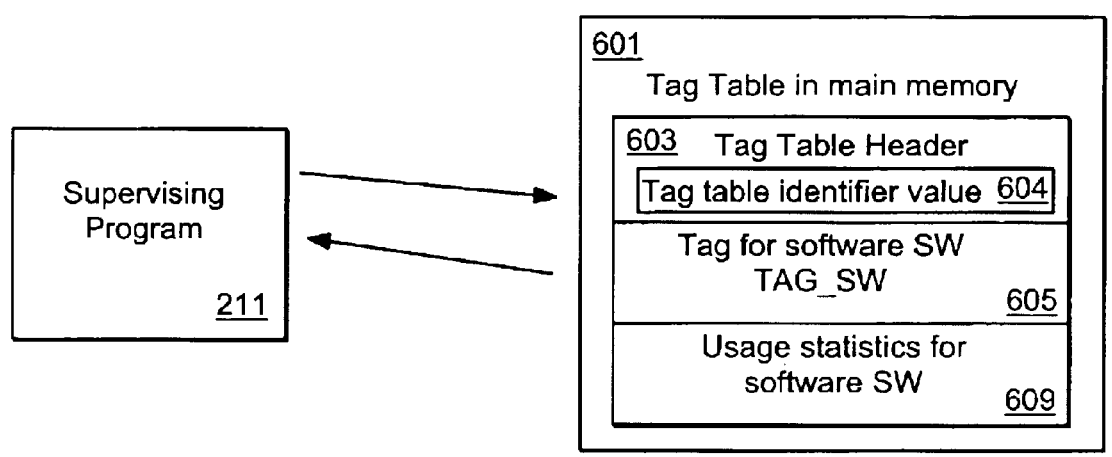
FIG. 7 illustrates the Supervising Program and its relationships to the Tag Table.

FIG. 7 illustrates the Supervising program 211 and its relationship to the Tag Table 601. A Tag Table is a data structure which includes a Tag 605 (whose composition will be specified in connection with purchases) for each copy of software that has been purchased or rented for use on the User Device 140. For each Tag 605 included in the Tag Table 601, the Tag table 601 contains at least one field indicating a Usage Status. The Usage Status field 609 can also indicate use statistics for the copy of w software associated with the tag 605. The Tag Table 601 also includes a Tag Table header 603 that uniquely identifies the Tag Table 601. The Tag Table header 603 can include information concerning User Device use statistics and can include a Continuation Message 104 (FIG. 1). The Tag Table header 603 also includes a Tag Table Identifier value ID 604. A User Device 140 can have one or more Tag Tables, each with its own Tag Table Identifier value 604. The Tag Table 601,602 stores information determining the permissibility of copies of software to be used on a User Device 140, and records software usage statistics which may be employed for billing by Vendors or Lessors of the software.

Privacy Preserving Purchases

In the present invention, Purchasers, Renters, and Users (collectively referred to hereafter as Purchasers) of software preserve their privacy because they never reveal their identity, neither during purchase of software, nor during use of software.

A Tag Table 601 is a table or file stored in a User Device 140 containing information related to tags 605 associated with copies of software as well as information relating to the use of copies of software.

A Tag Table Identifier value ID 604 (FIG. 8) is an identifier of a Tag Table, stored in the Tag Table 601. The Tag Table identifier value ID 604 is generated either by hardware, by the User, by a physical process such as thermal noise, or by some combination of these and other means. A characteristic of the Tag Table identifier value ID 604 is that its association with a particular Purchaser of a copy of software can not be established by third parties. In one embodiment of the invention, the Purchaser uses an anonymous channel, such as the one provided by the Freedom product offered by Zero-Knowledge Systems Inc. of Montreal Canada, for all communications, and creates the Tag Table Identifier value ID 604 for a Tag Table 601, 602 on his or her User Device 140. An anonymous channel is a communication channel that does not reveal the identity of a message sender using the channel.

Figure 8:
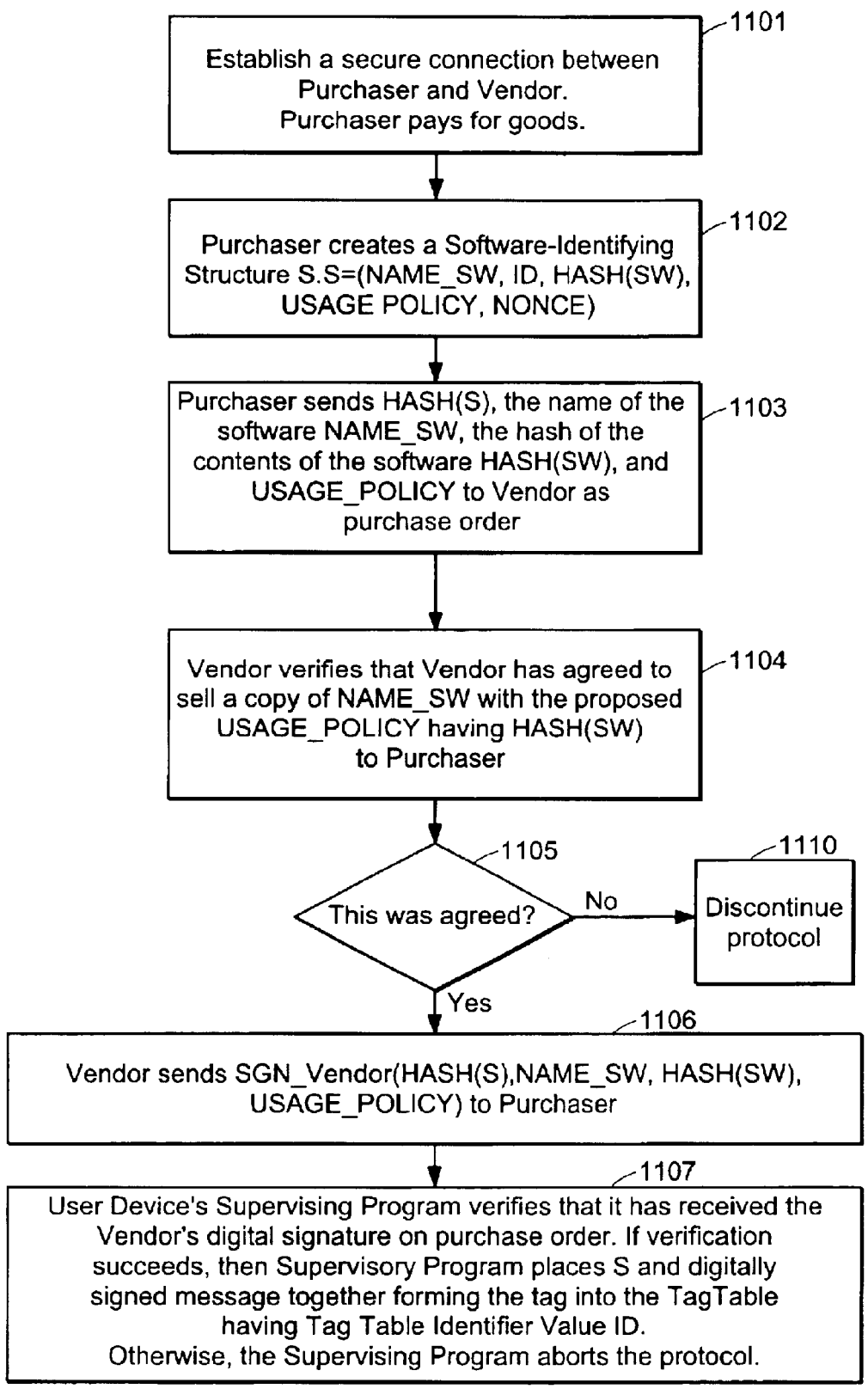
FIG. 8 is a flowchart illustrating the steps for purchasing or renting (hereafter jointly referred to as purchasing) a copy of software in a manner that preserves the privacy of the Purchaser.
Figure 9:
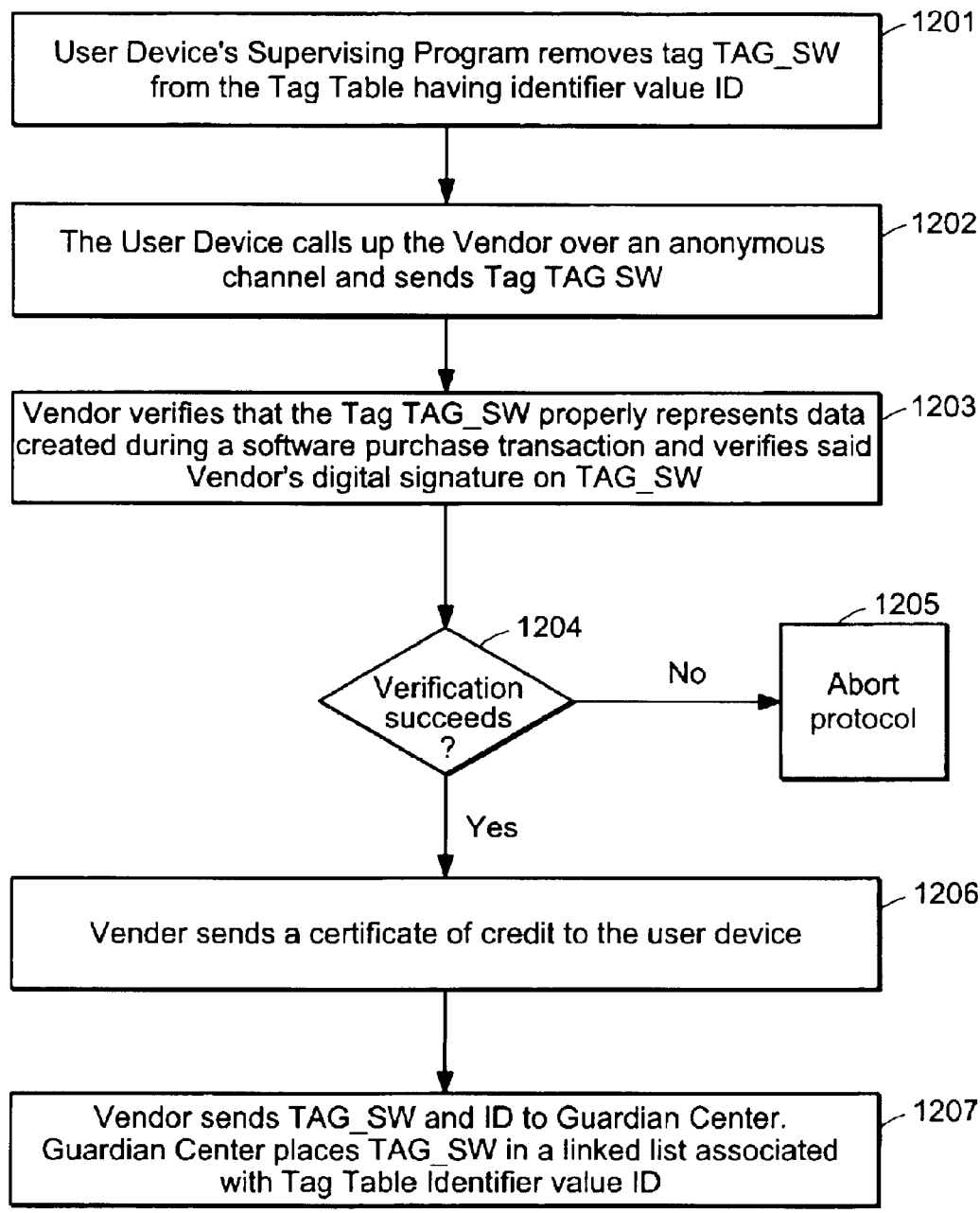
FIG. 9 is a flowchart illustrating the steps for decommissioning a tag.

FIG. 8 is a flowchart illustrating the steps for purchasing or renting (hereafter jointly referred to as purchasing) a copy of software in a manner that preserves the privacy of the Purchaser. FIG. 9 is described in conjunction with FIG. 8. The software purchasing transaction may be executed by the Supervising Program 211 in the Purchaser's User Device, or by a special Purchasing Program 205 (FIG. 2) in the Purchaser's User Device or in some other User Device 140.

At step 1101, a connection for secure communication is established between the Purchaser and the Vendor 110 using for example the SSL protocol offered by Netscape Corporation. Secure communication is a way of sending a value X such that only the intended recipient can see X in unencrypted form, though other agents may observe the network protocol or see the package by which X is transported. A sealed envelope delivered by a reliable courier is one way to securely transmit the contents of an envelope. Sending a message by use of the NETSCAPE SSL protocols for secure communication is a way to ensure secure communication over the communication network. Communication 101 and 102 (FIG. 1) takes place through an anonymous channel to avoid revealing the network identifier of the Purchaser. The Purchaser may send payment over the secure connection for purchase or rental of a copy of software SW according to some Usage Policy USAGE_POLICY, using any acceptable form of payment such as a credit card or (preferred for privacy) some form of anonymous cash. Anonymous cash is an electronic method of payment which does not reveal the identity of the payer. Credit card companies such as the American Express Corporation provide a limited form of anonymous credit in which the vendor does not know who the purchaser is, though American Express does. Usage Policy for a copy of software SW is a set of rules prescribed by a Vendor or some organization for governing the manner in which the copy may be used. Examples of such rules include, but are not limited to, unlimited usage, usage 200 times, or usage for one month from time of purchase. The Usage Policy attached to a copy of software SW is enforced in the present invention by the Supervising Program ("SP") 211. Processing continues with step 1102.

At step 1102, the Purchaser creates a Software-Identifying Structure S=(NAME_SW, ID, HASH(SW), USAGE_POLICY, NONCE), but does not reveal the Structure S. NAME_SW is a name for the specific software SW a copy of which is being purchased or rented. ID is a Tag Table Identifier value 604. SW is specific Vendor software protected by the invention, for example, the code of software named Spread. HASH(SW) is a hash function value resulting from computing a specified hash function H on specified portions of the software SW. A portion of a software SW refers to the text or data comprising SW or to a collection of parts of the text or data comprising SW, where the parts need not be contiguous and may overlap. NONCE is used to protect the privacy of the Purchaser in case of a repurchase of the same software. A NONCE is a randomly chosen number or string intended to occur only once. This requires that the number or string be chosen from a sufficiently large set to make duplications unlikely. The NONCE can be produced by methods such as, through thermal noise as suggested by the design of the Pentium III produced by the Intel Corporation®, it can depend on the time it is produced, or can depend on the values of some memory locations in the User Device. Processing continues with step 1103.

At step 1103, the Purchaser sends to the Vendor 110, a Software Purchase Order SPO_SW for a copy of SW including (HASH(S), NAME_SW, HASH(SW), USAGE_POLICY). The NONCE and Tag Table identifier value ID 604, which are masked in the hash function value HASH(S), are not revealed to the Vendor 110. Processing continues with step 1104.

At step 1104, the Vendor 110 verifies that it has agreed to sell or lease a copy of the software SW called NAME_SW, with the proposed USAGE_POLICY, and whose contents SW produces the hash function value HASH(SW) to the Purchaser in this secure session. In an alternate embodiment, a proof of payment may be sent by the purchaser to the vendor 110. Processing continues with step 1105.

At step 1105, if the verification succeeds, then processing continues with step 1106, otherwise processing continues with step 110.

At step 1106, the Vendor 110 digitally signs the message it received, producing SGN_Vendor (HASH(S), NAME_SW, HASH(SW), USAGE_POLICY) and sends the digitally signed message to the Purchaser. Processing continues with step 1107.

At step 1107, upon receiving the digitally signed message created by the Vendor 110, the Supervising Program 211 in the Purchaser's User Device employs the Vendor's public signature key 318 (FIG. 3) to verify that the received message was digitally signed by the Vendor and equals the message sent to the Vendor. Provided all the previous verifications succeed, the Supervising Program 211 stores the Software-Identifying Structure S, the Vendor's name and the Vendor's digitally signed message in the Tag Table 601. Together, the Software Identifying Structure S, the Vendor's name, and the Vendor's signed message constitute the Tag 605 associated with the copy of SW in the User's Device. Verification of a digital signature on a signed message is a computation using the claimed signer's public signature key which, when producing a specified result, serves as proof that the digital signature was produced by the claimed signer, in which case the verification is said to be successful. Verifying a condition involving equalities and inequalities between corresponding elements in two messages or two sequences of elements is said to be successful if all comparisons that should yield equality and all comparisons that should yield inequality, respectively, do so. Processing is complete and the secure communication channel between the Purchaser and the Vendor closes.

At step 110, the purchase protocol is stopped. Processing is complete.

The above privacy-protecting purchase protocol is structured so that the Vendor 110 knows neither the name of the Purchaser because of the anonymous channel and the anonymous mode of payment, nor the Tag Table Identifier value ID 604 of the Tag Table 601 on the Purchaser's User Device 140. The latter is assured by the fact that the Tag Table Identifier value ID 604 is included in the Software-Identifying Structure S, but the Vendor receives only the hash function value HASH(S) of the Software Identifying Structure and this conceals the value of the Tag Table identifier value ID 604. At the same time, by mechanisms to be described later, the Vendor 110 is assured that this purchased copy of software with its Tag 605 will run only on a User Device 140 whose Tag Table Identifier value ID 604 matches the value in the Tag's Software-Identifying Structure.

Decommissioning and Returning a Tag for a Copy of Software

In the course of use of a copy of software SW, the need may arise to return the copy of software to the Vendor 110 and to obtain credit for this return. The use of a copy of software includes, but is not limited to, installing, using, executing, running, connecting with, reading, otherwise retrieving from storage medium or modifying a storage medium, displaying, playing, viewing, printing, copying, transmitting, or accessing the copy of software by use of or on a User Device 140.

One need for returning a copy of software arises when the owner of a copy of software wants to transfer this software to a User Device 140 having a different Tag Table Identifier value 604. The owner returns the copy of software to the Vendor 110, and obtains a certificate of credit which can be used for purchase of a new copy.

Assume that the software in question is called NAME_SW, that the copy of software SW has a Tag TAG_SW 605 associated with it. The User Device 140 has a Tag Table 601. The Tag Table 601 has a Tag Table Identifier value ID 604. The Tag TAG-SW 605 is stored in the User Device 140's Tag Table 601 with Tag Table Identifier value ID 604. The Software Identifying Structure used in purchasing the copy of software is S.

FIG. 9 is a flowchart illustrating the steps for decommissioning a tag 605.

At step 1201, the Supervising Program 211 (FIG. 2) in the User Device 140 (FIG. 1) removes the Tag TAG_SW 605 from the Tag Table 601 with Tag Table identifier value ID 604. Processing continues with step 1202.

At step 1202, the User Device 140 (FIG. 1) calls up the Vendor 110 (FIG. 1) over a secure channel and sends the Tag TAG_SW 605 and the Software Identifying Structure S. The call can be made either by the Supervising Program 211 (FIG. 1) or, by a Purchasing Program 205 (FIG. 2) executing in the User Device 140 (FIG. 1). Processing continues with step 1203.

At step 1203, the Vendor 10 verifies that TAG_SW 605 and the Software Identifying Structure S properly represents data created during a software purchasing transaction. The Vendor 110 verifies its digital signature stored in the TAG_SW 605 and verifies that the hash function value HASH(S) equals to the corresponding value in the digitally signed TAG_SW 605. The Vendor further reads the Tag Table Identifier value ID 604 from the Software Identifying Structure S.

At step 1204, if all these verifications are successful, processing continues with step 1206. If not, processing continues with step 1205.

At step 1205, the protocol is aborted. Processing is complete.

At step 1206, the Vendor 110 (FIG. 1) sends to the User Device 140a Certificate of Credit for an agreed upon sum of money or for some specified goods or services. The goods can be a new copy of the decommissioned software, or some other agreed upon software. Processing continues with step 1207.

At step 1207, the Vendor 110 sends TAG_SW 605 and the Tag Table Identifier value ID 604, received from the User Device 140, to the Guardian Center 130. The Guardian Center 130 stores TAG_SW 605 in a list associated with the Tag Table Identifier value ID 604.

During at least one subsequent Call-Up, to be described later, from a User Device 140 involving the Tag Table 601 with Tag Table Identifier value ID 604, the Guardian Center 130 will request the calling Supervising Program 211 to verify that the Tag TAG_SW 605 has indeed been removed from the Tag Table 601. If this check fails, then the Guardian Center 130 invalidates the Tag Table Identifier value ID 604.

Privacy-Preserving Call-Up

Call-Ups initiated and executed by the Supervising Program 211 from a User Device 140 to a Guardian Center 130 occur from time to time. Guardian Center 130 Call-Ups are initiated in accordance with a Call-Up Policy, depending on whether a certain amount of usage of a copy of software has occurred, or a certain amount of time has elapsed since the last Call-Up, or when a network connection is made, or some combination of the above. A Call-Up may also be required soon after a Supervising Program 211 has been booted. A Call-Up may be required when the difference between the current time as measured by an absolute time counter and the time stored in SGN_GC(HASH(Immediately Previous Tag Table, Time of Immediately Previous Call-Up, ID) exceeds a value specified in the Call-Up Policy. Here SGN_GC denotes the digital signature function of the Guardian Center 130. HASH(Immediately Previous Tag Table) denotes the hash function value of the User Device's Tag Table sent by the Supervising Program 211 to the Guardian Center 130 in the most recently previously executed Call-Up and ID is the value of the Tag Table Identifier value 604 for that Tag Table.

Figure 10:
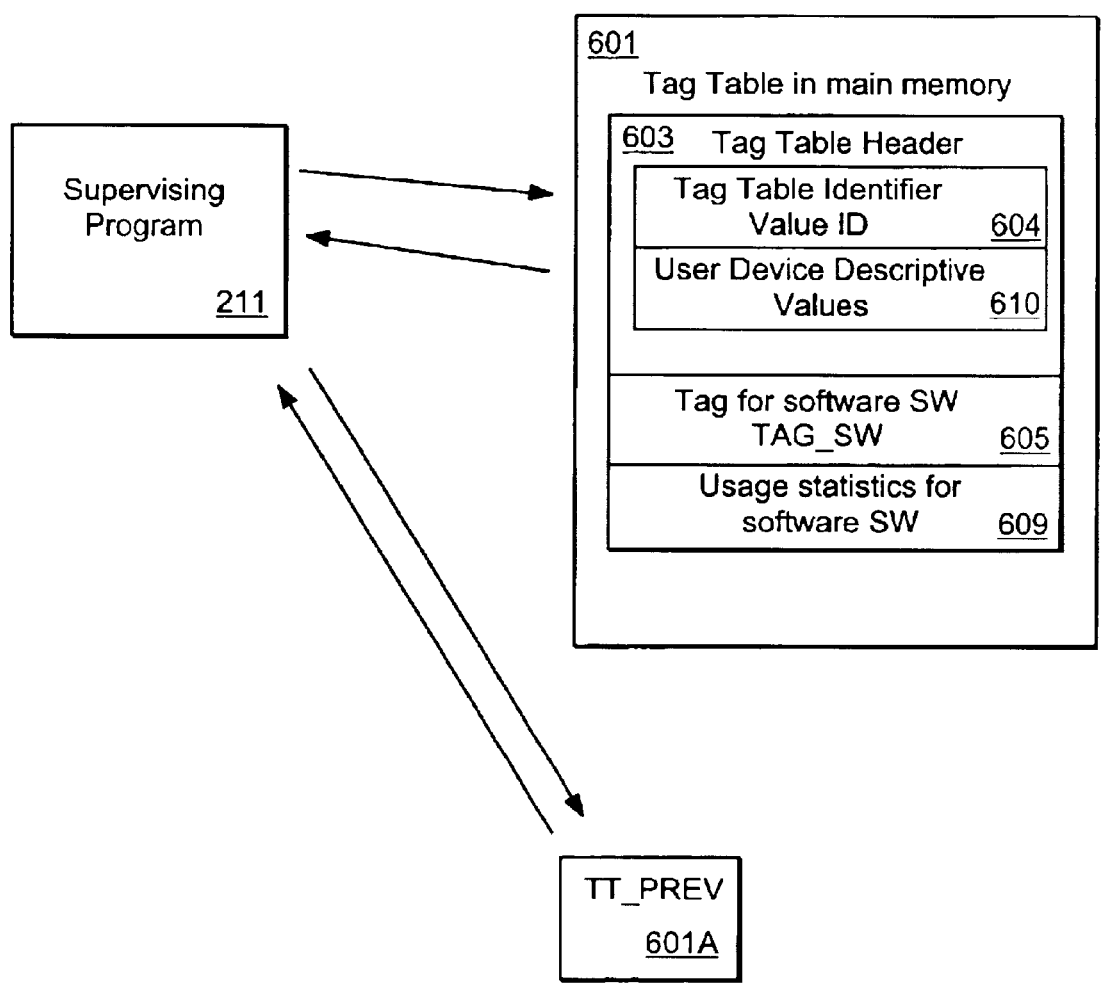
FIG. 10 illustrates an alternate embodiment for the tag table shown in FIG. 7.

FIG. 10 illustrates an alternate embodiment for the Tab Table 601 shown in FIG. 7. The Tag Table 601 in this embodiment includes a field storing the above digitally signed message (not shown) SGN_GC(HASH(Immediately Previous Tag Table), Time of Immediately Previous Call-Up, ID), which was sent by the Guardian Center to the User Device 140 during the most recent Call-Up. The immediately previous Tag Table, to be called herein TT_PREV 601a, is also stored and available. If there is no previous Tag Table with the Tag Table 601a Identifier value ID 604, then the Supervising Program 211 performs a special initializing Call-Up that creates a Tag Table 601 with the Tag Table Identifier value ID 604. The Tag Table Header 603 includes further fields representing features of the User Device's (internal) environment which are given by User Device Descriptive Values "(UDDV)" 610. Examples of User Device Descriptive Values 610 include, but are not limited to, a User Device processor's unique serial number, the number of files of a specified kind stored on the User Device's non-volatile storage device, features and numerical values derived from the User Device's data structures describing the physical layout of the file system and other data in the storage device. The UDDVs 610 are chosen so that they are only slowly changing, if at all, during use of the User Device. Furthermore, the UDDVs 610 are chosen so that it is not likely that they will change over time from a configuration, call it C, into a markedly different configuration C_1, and then change back into configuration C.

To protect the privacy of the caller's network location, Call-Ups may employ an anonymous channel such as the one offered by Zero-Knowledge Systems Inc. of Montreal Canada. The Privacy-Preserving Call-Up never reveals the association between the software used on a User Device 140 and the identity of the owner or user of the User Device 140.

Figure 11A:
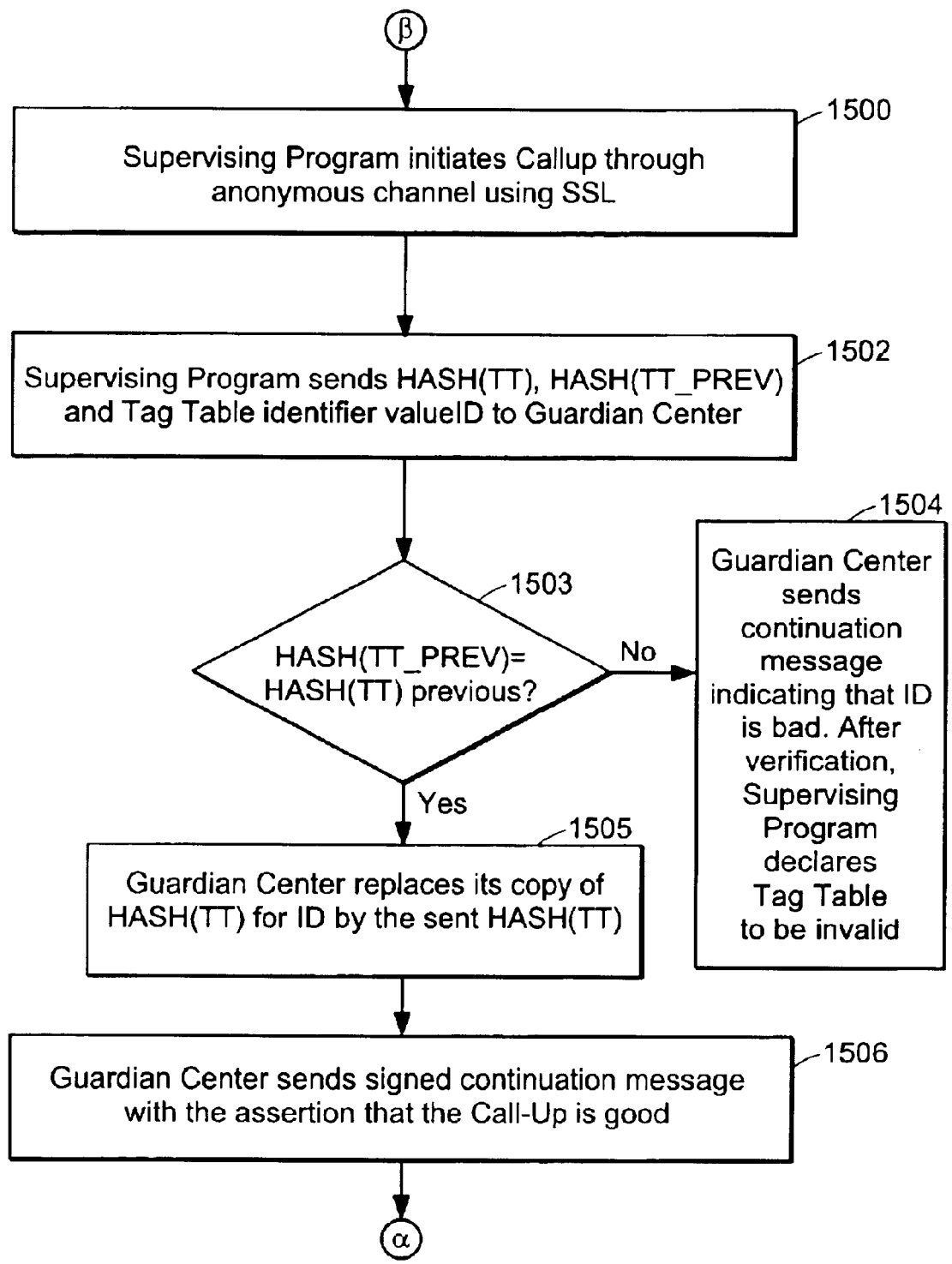
FIGS. 11A and 11B is a flowchart illustrating the steps for performing a Privacy-Preserving Call-Up.
Figure 11B:
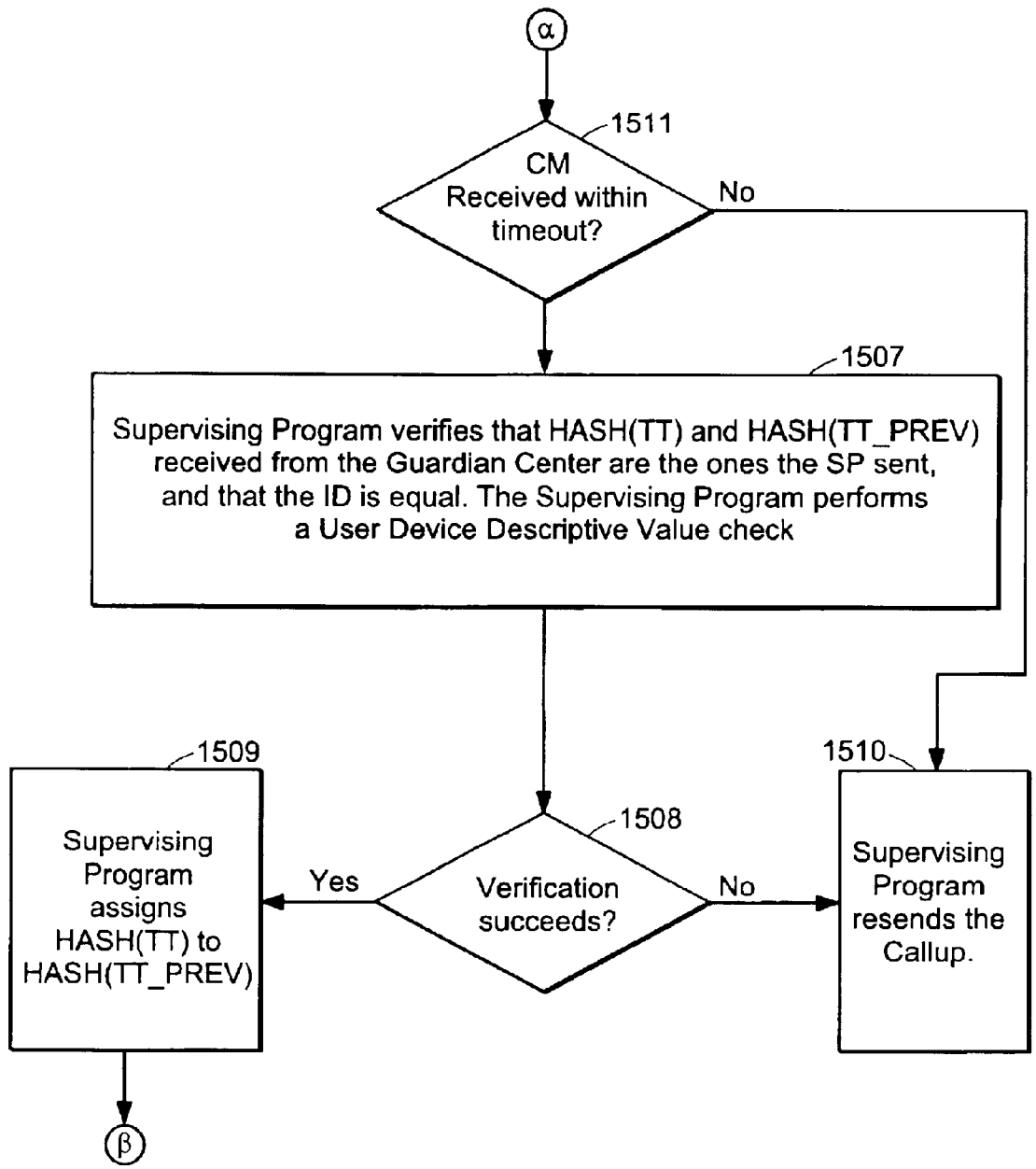

FIGS. 11A–B is a flowchart illustrating the steps for performing a Privacy-Preserving Call-Up. FIGS. 11A and 11B are described in conjunction with FIG. 10.

Referring first to FIG. 11A, at step 1500, a connection for secure communication is established between the User Device 140 and the Guardian Center 130, using for example the SSL protocol offered by Netscape Corporation. Processing continues with step 1502.

At step 1502, performing a Call-Up through the secure communications channel, the Supervising Program 211 executing in the User Device 140 sends to the Guardian Center 130 the following data: the hash function value HASH(TT) of the current Tag Table 601, the hash function value HASH(TT_PREV) of the Tag Table 601 as of the last Call-Up and the Tag Table Identifier value ID 604. Processing continues with step 1503.

At step 1503, the Guardian Center 130 checks that HASH(TT_PREV) is equal to the last value of HASH(TT) that the Guardian Center 130 received from the User Device 140 associated with the Tag Table Identifier value ID 604. If they are equal, processing continues with step 1505. If the check evaluates to "false", two Tag Tables 601 on different User Devices 140 have the same Tag Table Identifier value ID 604, and possible piracy has occurred, processing continues with step 1504.

At step 1504, the Guardian Center 130 sends a digitally signed message SGN_GC("present identifier is bad", HASH(TT_PREV), HASH(TT), ID). Upon receiving this message, the Supervising Program 211 verifies the Guardians Center's digital signature and verifies that the hash function values and the Tag Table Identifier value D 604 included in the digitally message are equal to the corresponding values sent by the Supervising Program 211 in the current Call-Up. If verification is successful then the Supervising Program 211 declares the entire Tag Table 601 with Tag Table Identifier value ID 604 to be invalid. Subsequently to this invalidation, no Tag 605 with the Tag Table Identifier value ID 604 in its Software Identifying Structure can be employed to enable the use of a copy of software. The Guardian Center 130 rejects any future Call-Ups from a User Device 140 involving a Tag Table 601 with the Tag Table Identifier value ID 604. Processing is complete.

At step 1505, the Guardian Center 130 replaces its stored version of HASH(TT) associated with the Tag Table Identifier value ID 604 by the value of HASH(TT) received in the current Call-Up. Processing continues with step 1506.

At step 1506, the Guardian Center 130 sends a digitally signed Continuation Message 104 (FIG. 1) to the User Device 140 including the received fields: SGN_GC(HASH(TT), TIME OF CALL-UP, ID). Processing continues with step 1507.

Continuing now with FIG. 11B, the Supervising Program 211 expects to receive a Continuation Message 104 within some specified timeout period, for example, one minute. At Step 1511, the Supervising Program 211 tests whether a Continuation Message 104 has been received within the timeout period. If so, processing continues with step 1507. If not, processing continues with step 1510.

At step 1507, upon receiving the digitally signed Continuation Message, the Supervising Program 211 verifies that the value HASH(TT) received from the Guardian Center 130 is equal to the corresponding value sent by the Supervising Program 211 in its Call-Up message. The Supervising Program 211 also verifies that the value ID received in the Continuation Message 104 (FIG. 1) equals the Tag Table Identifier value ID 604 of the Tag Table 601 for which the Call-Up was made. Other checks may be made as will be discussed in more detail in conjunction with FIGS. 13A–13B.

Furthermore, the Supervising Program 211 verifies the digital signature received in the Continuation Message 104 from the Guardian Center 130, using the Guardian Center's Public Key. A public key 318 (FIG. 2) is used by a recipient of data purported to be digitally signed, to check and authenticate the signature. If all the above verifications are successful, processing continues with step 1509 If not, processing continues with step 1510.

At step 1509, the Supervising Program 211 replaces HASH(TT_PREV) by HASH(TT) and allows use of the software. The secure communication channel between Supervising Program 211 in the User Device 140 and the Guardian Center 130 is closed. Processing is complete.

At step 1510, the Supervising Program 211 resends its Continuation message and processing continues with step 1500.

It is possible that a Call-Up can not be completed due to, for example, a break of communication between a User Device 140 and the Guardian Center 130. To preserve, in this case, the proper meaning of HASH(TT) and HASH(TT_PREV) for the Guardian Center 130 and the Supervising Program 211, the following rules are adopted in embodiment of the invention. Once the Guardian Center 130 has sent the Continuation Message 104, the Guardian Center 130 sets a new value for HASH(TT_PREV), without waiting for an acknowledgment message from the Supervising Program 211. The Supervising Program 211 updates the values of HASH(TT) and HASH(TT_PREV) it uses for Call-Up only if it receives a Continuation Message 104. If the Supervising program 211 does not receive a Continuation Message 104, it re-sends the original Call-Up Message 1510. The Guardian Center 130, upon receiving a resent Call-Up Message, resends the Continuation Message 104 it had sent in response to the resent Call-Up Message. Whether the Supervising Program 211 will allow continued use of software with associated Tags in the Tag Table 601 for which a Call-Up was made but not completed, is specified in the above Call-Up Policy.

A possible attack on the protection mechanisms provided by the linkage between a Tag 605 incorporating a Tag Table Identifier value ID 604 and a copy of software, would be to have several User Devices including Tag Tables 601 with the same Tag Table Identifier value ID 604. If a would-be software pirate could do that, then he could use the above copy of software with its associated Tag 605 on multiple User Devices 140. The Call-Up procedure explained in conjunction with FIGS. 11A–11B prevents such a direct attack because the comparison by the Guardian Center 130 between the hash function value HASH(TT_PREV) sent by the Supervising Program 211, and the corresponding value stored by the Guardian Center 130 from the last Call-Up for the Tag Table Identifier value ID 604, prevents interleaving of Call-Ups for the same Tag Table Identifier value ID 604 from different User Devices 140.

The above attack can be refined by having each of the above pirating User Devices 140 transfer ("hand-off") its hash function value HASH(TT_PREV) to the next User Device 140 required to perform a Call-Up for the same Tag Table Identifier value ID 604. The present invention provides a number of protection methods against the hand-off attack.

In one embodiment of the invention the Tag Table Header 603 includes User Device specific Descriptive Values ("UDDV") 610. Examples of UDDV 610 features include but are not limited to: data derived from the User Device's file system, data derived from the User Device's B-trees or other indexes and data structures related to the User Device's specific layouts of data on disks or other storage devices. The features employed in any implementation of a UDDV 610 have the property that they are User Device specific and change slowly or not at all. If the User Device's processors or other hardware or software components include unique serial numbers or other readable unique identifiers, some or all of the numbers or identifiers may be included in the UDDV 610 features represented in a User Device's Tag Table Header 603.

In this embodiment the Supervising Program 211 stores and updates in the User Device 140, a specified number k, for example k=5, of Tag Tables 601 TT_PREV_1, . . . , TT_PREV_k, sent by the Supervising Program 211 in the last k Call-Ups for the Tag Table Identifier value ID 604. The Guardian Center 130 stores and updates the list of corresponding hash function values H_1=HASH(TT_PREV_1), . . . , H_k=HASH(TT_PREV_k).

Returning to FIG. 11A, at step 1502, during Call-Up, the Supervising Program 211 sends to the Guardian Center 130 the following data: The hash function value HASH(TT) of the current Tag Table 601, the hash function value HASH(TT_PREV_1) of the Tag Table 601 as of the last Call-Up and the Tag Table Identifier value ID 604. Processing continues with step 1503.

At step 1503, upon receiving the Call-Up message from Supervising Program 211, the Guardian Center 130 verifies that the received hash function value HASH(TT_PREV_1) equals the above value H_1 it has stored. If verification fails then processing continues with step 1504. If the above verification succeeds, processing continues with step 1505.

At step 1505 the Guardian center 130 updates the list of the last k receive hash function values by placing the currently received value at the top of the list and removing the last value in the list. Processing continues with step 1506.

At step 1506, the Guardian Center 130 sends to the Supervising Program 211a digitally signed Continuation message 104 which now includes more information: SGN_GC(H_I, . . . , H_k, TIME OF CALL-UP, ID). Because the Guardian Center 130 has updated its list of received hash function values, now H_1 equals the hash function value HASH(TT) received during the Call-Up. Processing continues with step 1511 (FIG. 11B).

Continuing with FIG. 11B, at step 1507, upon receiving the above Continuation Message 104, the Supervising Program 211 verifies, using its list of the last k sent Tag Tables, that H_1=HASH(TT), H_2=HASH(TT_PREV_1), . . . , Hk=HASH(TT_PREV_k−1). If verification succeeds processing continues with step 1508. Otherwise, processing continues with step 1510.

At step 1507 the Supervising Program 211 verifies the Guardian Center's digital signature on the Continuation Message 104. If verification fails then Processing continues with step 1510. Otherwise processing continues with step 1509.

At step 1509, the Supervising Program 211 examines the User Device Descriptive Values 610 included in the Headers of the Tag Tables TT, TT_PREV_I, TT_PREV_k-1, stored in the User Device 140. It then performs a UDDV check.

At step 1510, the received Continuation Message 104 cannot be a correct response to the current Call-Up and the Supervising Program 211 restarts the Call-Up process.

Figure 12:
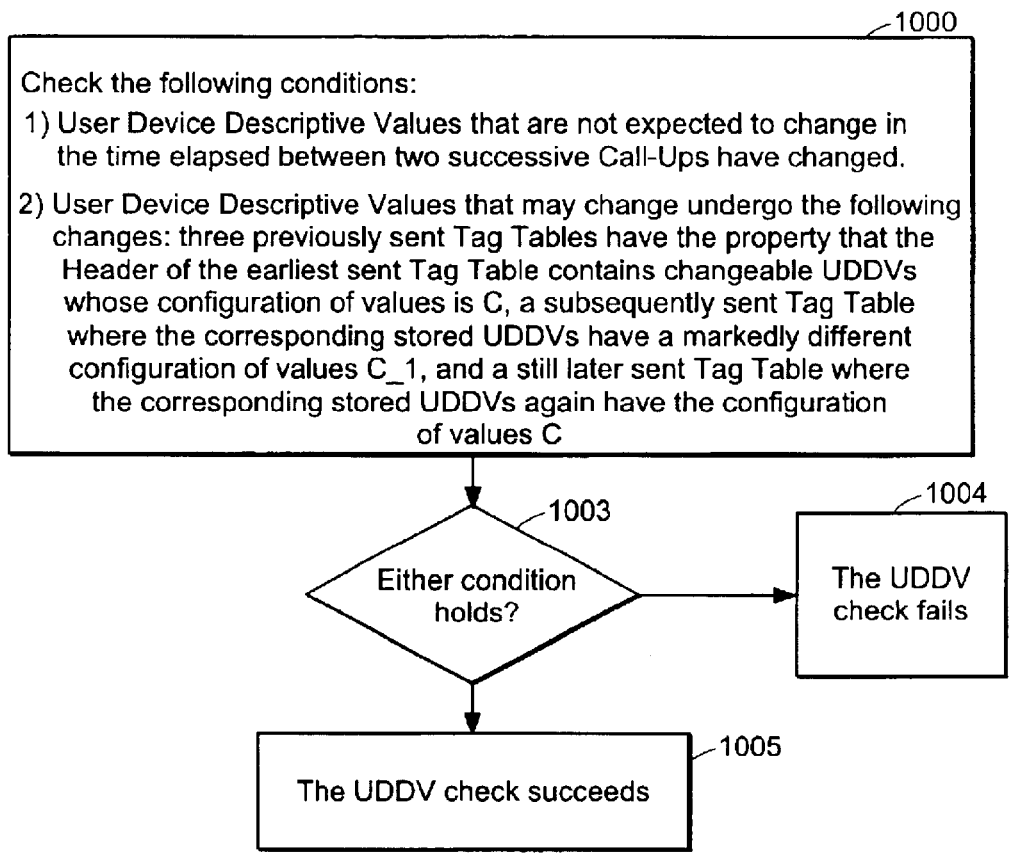
FIG. 12 illustrates a flowchart for performing the UDDV check.

FIG. 12 illustrates the UDDV check, at step 1000, if a specified number of UDDVs are not expected to change in the time elapsed between two successive Call-Ups, and the Supervising Program 211 does detect a change in that specified number of values stored in the Headers of two successively sent previous Tag Tables 601, then the UDDV check fails. Also, if the Supervising Program 211 detects three previously sent Tag Tables 601 so that the Header of the earliest sent Tag Table includes specified UDDVs whose configuration of values is C, a subsequently sent Tag Table 601 where the corresponding stored UDDVs have a markedly different configuration of values C_1, and a still later sent Tag Table 601 where the corresponding stored UDDVs again have the configuration of values C, then the UDDV check fails and the verifications fail.

At step 1003, the supervising program determines if either of the conditions holds. If so, processing continues with step 1004. If not, processing continues with step 1005.

At step 1004, the UDDV check has failed processing continues with step 1508 (FIG. 11B).

At step 1005, the UDDV check has succeeded processing continues with step 1508 (FIG. 11B).

Returning to FIG. 11B, at step 1508 if the UDDV verifications failed, processing continues with step 1510. If the UDDV verifications succeed, processing continues with step 1509.

At step 1510 the Supervising Program resends the Call-Up. In an alternate embodiment, the Supervising Program can declare the entire Tag Table 601 with Tag Table Identifier value D 604 to be invalid. Subsequent to this invalidation, no Tag with the Tag Table Identifier value ID 604 in its Software Identifying Structure can be employed to enable the use of a copy of software.

Enhanced Privacy-Preserving Call-Up

Figure 13A:
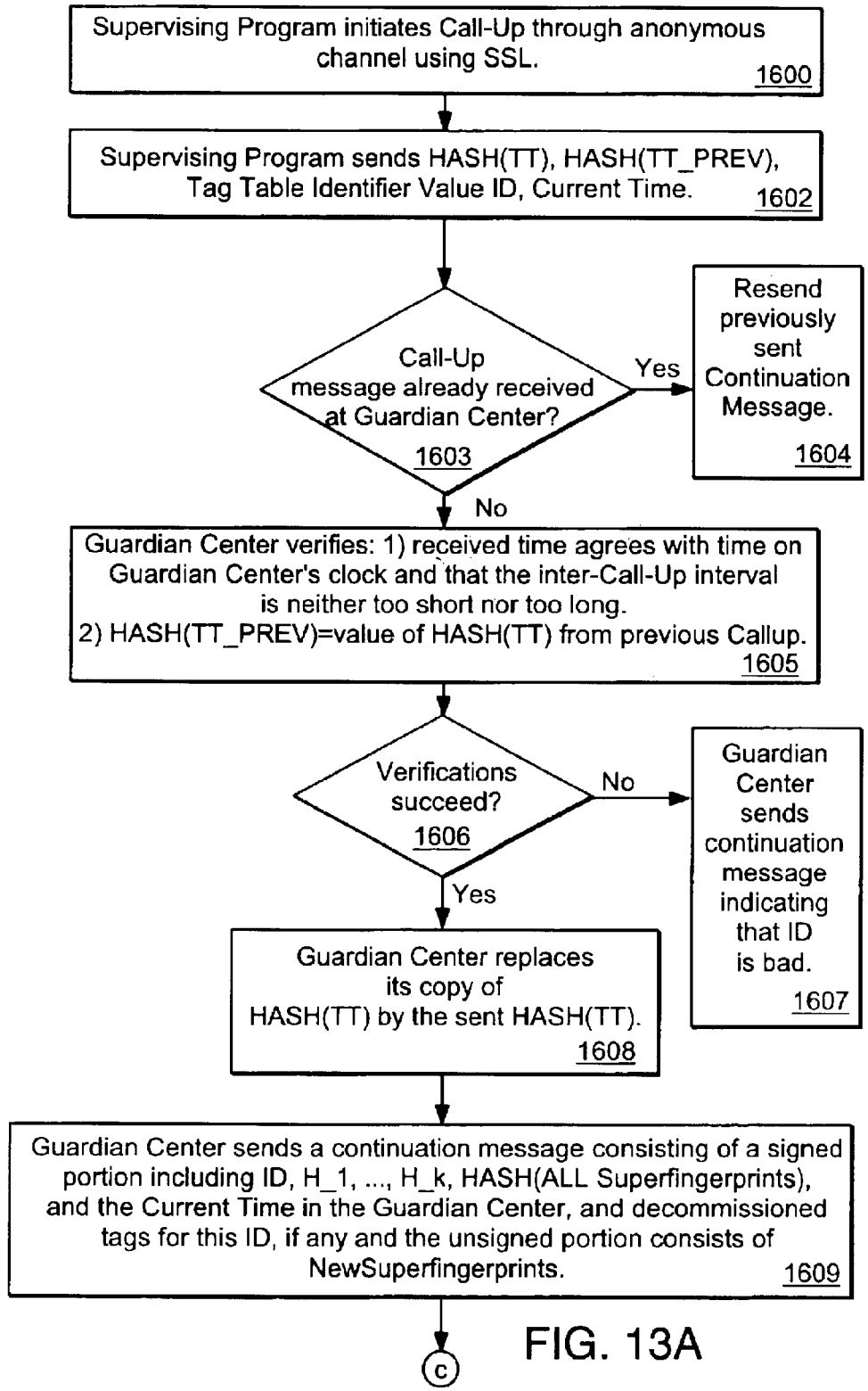
FIGS. 13A–B is a flowchart illustrating another method for performing a Privacy-Preserving Call-Up.
Figure 13B:
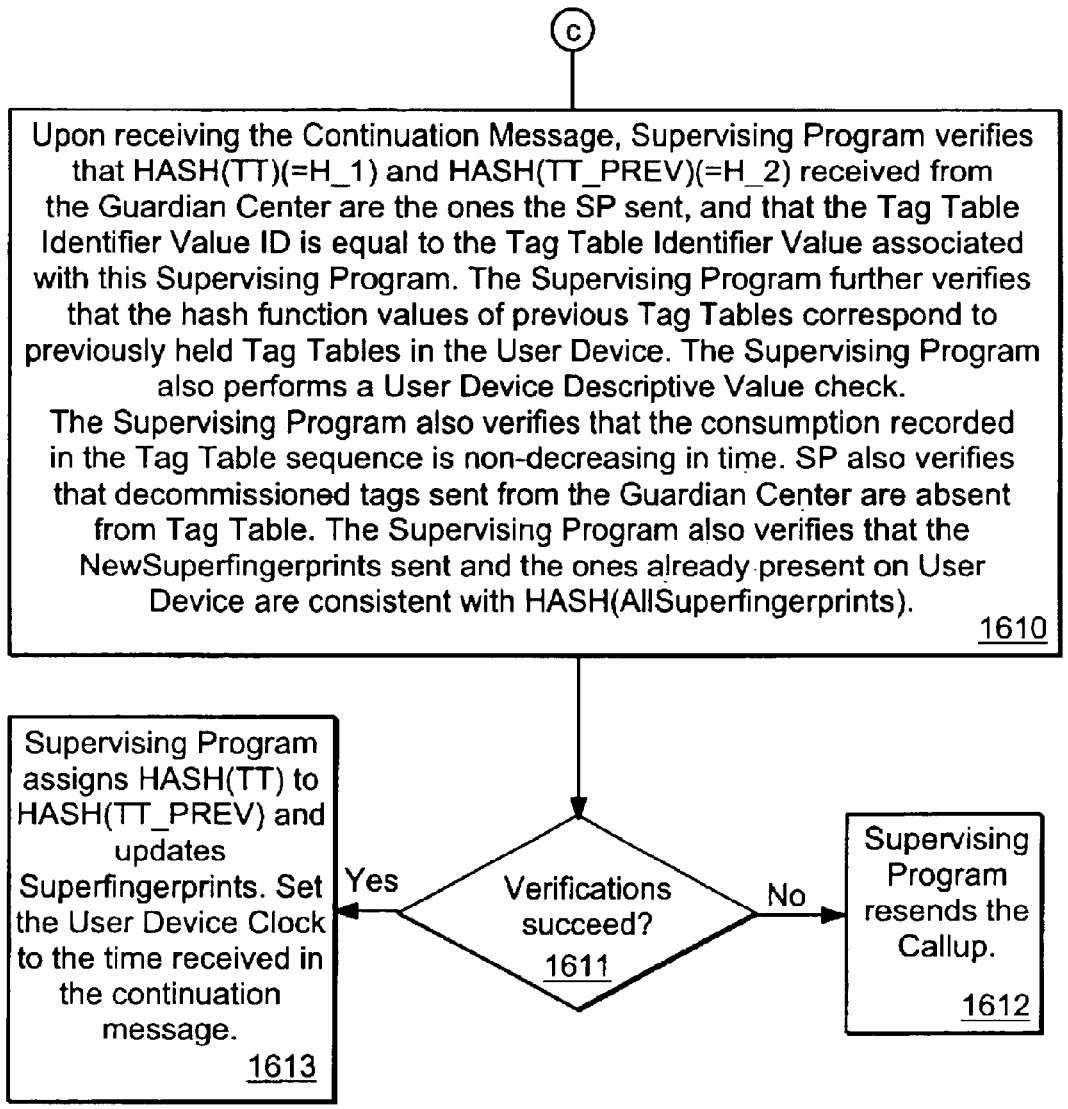

FIGS. 13A–B is a flowchart illustrating another method for performing Privacy-Preserving Call-Up. The method shown in FIGS. 16A–B adds further mechanisms to the embodiment shown in FIGS. 11A–B.

Referring to FIG. 13A, at step 1600, the Supervising Program 211 initiates a Call-Up through an anonymous channel. Processing continues with step 1602.

At step 1602, the Supervising Program 211 sends a Call-Up message including the hash function value HASH (TT) of the current Tag Table 601, the hash function value HASH(TT_PREV) of the Tag Table 601 as of the last Call-Up, and the Tag Table Identifier value ID 604, the Current Time read from a clock within the User Device 140, as well as other fields whose use will be explained later. In this embodiment, the Tag Table 601 includes UDDVs 610. Processing continues with step 1603.

At step 1603, the Guardian Center 130 determines if this Call-Up message is identical to one already received. If so, processing continues with step 1604. If not processing continues with step 1605.

At step 1604, the Guardian Center 104 resends the previous sent continuation message. Processing is complete.

At step 1605, the Guardian Center 130 checks whether the received Current Time agrees with the time on the Guardian Center's clock. The Guardian Center 130 further checks whether the difference between the current Call-Up time and the last Call-Up time for this Tag Table Identifier Value ID 604 is consistent with the Guardian Center's 130 recording of time elapsed and whether it exceeds some policy-specified maximum allowed time between Call-Ups or is smaller than a policy-specified minimum allowed time between Call-Ups. The Guardian Center 130 further checks whether HASH(TT_PREV) is equal to the last value of HASH(TT) that the Guardian Center 130 received from the User Device 140 associated with the Tag Table Identifier value ID 604. Processing continues with step 1606.

At step 1606, if all the verifications succeed, then processing continues with step 1608. If not, processing continues with step 1607.

At step 1607, the Guardian Center sends a message indicating that the sending Tag Table Identifier value ID 604 is bad. Processing is complete.

At step 1608, the Guardian Center 130 replaces its stored version of HASH(TT) associated with the Tag Table Identifier value ID 604 by the value of HASH(TT) that it received in the current Call-Up. Processing continues with step 1609.

At step 1609, the Guardian Center 130 sends a digitally signed Continuation Message 104 including a hash function value HASH(All Superfingerprints) of the sequence of all the currently and previously sent Superfingerprints (to be described later), a sequence of hash function values of current and previous Tag Tables H_1, . . . , H_k, where H_1=HASH(TT), the Tag Table Identifier value ID 604, the Current Time as read from the Guardian Center's clock, and the decommissioned tags (if any) for the Tag Table identifier value ID 604 to the User Device 140. The unsigned part of the Continuation Message 104 is a list of currently sent new of Superfingerprints, to be described later on.

Continuing with FIG. 13B at step 1610, upon receiving a Continuation Message 104, the Supervising Program 211 verifies that the value H_I=HASH(TT) received from the Guardian Center 130 is equal to the corresponding value sent by the Supervising Program 211 in its Call-Up message. The Supervising Program 211 also verifies that the Tag Table identifier value ID 604 received in the Continuation Message 104 (FIG. 1) equals the Tag Table Identifier value ID 604 of the Tag Table 601 for which the Call-Up was made. The Supervising Program 211 further verifies, using its list of the last k sent Tag Tables 601 associated with ID, that H_1=HASH(TT), H_2=HASH(TT_PREV_1), . . . , H_k=HASH(TT_PREV_k-1). The Supervising Program 211 further performs a User Device Descriptive Value (UDDV) check based on the User Device Descriptive values in those Tag Tables. The Supervising Program 211 further verifies that decommissioned tags included in the Continuation Message 104 are not in the current Tag Table TT. The Supervising Program 211 further checks that the Tag Tables 610 over time indicate a non-decreasing amount of consumption. That is, the usage value in the Tag Table 610 associated with each Tag is non-decreasing (i.e., either increases or stays the same). Finally, the Supervising Program 211 verifies the Guardian Center's digital signature on the signed portion of the Continuation Message 104, using the Guardian Center's public digital signature key stored in the User Device 140. Processing continues with step 1611.

At step 1611, if all the verifications succeed, processing proceeds with step 1613. If not, processing continues with step 1612.

At step 1612, the Call-Up message is sent again. In an alternative embodiment, the Tag Table Identifier Value ID can be invalidated, thus disabling the software being used on the User Device 140.

At step 1613 the Supervising program 211 assigns HASH (TT) to HASH(TT_PREV), updates the list of Superfingerprints, and sets the User Device's clock to the received Current Time. Processing is complete.

Clocks

Figure 14:
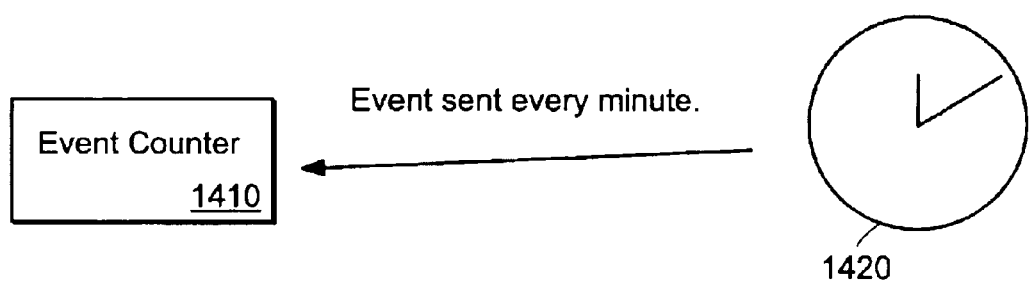
FIG. 14 illustrates the components of the clock event.

FIG. 14 illustrates the components of the clock event. One criterion for a Call-Up procedure to be executed is that a certain amount of time has elapsed since the last Call-Up procedure took place. A pirate may attempt to circumvent this criterion by resetting the system clock. A mechanism to stop this attack is to transform advances in the clock to events. For example, suppose that at most N minutes should elapse between one Call-Up execution and the next. Then there will be an event generated every time the system clock 1420 in the User Device 140 passes the minute mark and this event will increment a Minute Event Counter 1410. After a Continuation Message 104 is received, the Minute Event Counter 1410 is reset to 0. In this way, even if the pirate resets the time to some previous hour, the Minute Event Counter 1410 will count every minute (or most minutes). Time intervals other than minutes may be used to update other event counters.

In an alternative embodiment, the Guardian Center 130 includes in its Continuation Message 104 to a User Device 140a Current Time value read from the Guardian Center's clock. Upon receiving and verifying the Continuation Message 104, the Supervising Program 211 sets a Minute Event Counter 1410 in the User Device 140 to the received Current Time value. After the Minute Event Counter 1410 is advanced as described above.

Superfingerprint Use and Downloads

A user may write his or her own software or receive other software that may be free and install such copies of software which have no associated tags 605 on User Devices 140. This poses the danger that Users may install pirated copies of Vendor created software on a User Device 140 after removing their associated Tags 605, under the guise of user-generated or free software. Furthermore, an unscrupulous Vendor may pirate software, possibly modify it, and issue the pirated software with that Vendor's Tags. Either form of pirated software is herein referred to as "infringing software". In addition to using infringing software, a User Device 140 may infringe on a Vendor's rights in a copy of software which was legitimately purchased or rented from the Vendor for use on the User Device 140, by using the copy of software not in accordance with the Usage Policy included in the Tag associated with that copy of software; we call such use an "infringing use of software". An example of an infringing use is when the Usage Policy associated with a rented video game allows only five plays of the game and the User Device 140 attempts a sixth play. Another example of infringing use arises when the copy of software is a digitized image and the User Device 140 attempts to print out a hard copy of the image when this is not allowed in the associated Usage Policy. In the present invention, all of the above infringements are detected through the use of Superfingerprint mechanisms.

According to the present invention, a Superfingerprint is a collection of data and computer programs designed to enable the detection and subsequent prevention of use of an infringing copy of software or of an infringing use of a legitimate copy of software, on a User Device 140. In one embodiment of the present invention, a Superfingerprint further includes location information which is employed to specify portions of a copy of software on which a program included in the Superfingerprint computes a value. An example of location information is a specification of every instruction including the operation code "Add" or a "Multiply". The program included in the Superfingerprint first extracts, in accordance with the location information, the sequence of instructions containing the "Add" and "Multiply" operation codes present in a copy of software and then executes a routine on the sequence, but excluding the address or register portions of the instructions. In one embodiment, a Superfingerprint further includes a value and a condition relating the value computed by the program on the portion of the copy of software to a value included in the Superfingerprint. For example, the included values may be 15 and 32 and the condition may be that the number of detected "Add" instructions exceeds 15 and the number of "Multiply" instructions exceeds 15 and is less than 32. A program within the Superfingerprint verifies that the specified condition is verified. A Vendor or some agency acting on behalf of a Vendor may discover that copies of software infringing on that Vendor's rights are circulating amongst users. The Vendor may get an appropriate legal injunction against the use of that infringing software. The Vendor then prepares an appropriate Superfingerprint, using some or all of the mechanisms detailed below, and deposits the Superfingerprint with a Guardian Center 130. During Call-Ups from a User Device 140 to the Guardian Center 130, the Guardian Center 130 sends the Superfingerprint to the User Device 140. The Supervising Program 211 within the User Device 140 performs computations and checks specified in the Superfingerprint which detect the use of a copy of the infringing software, when such a use occurs, and halts that use. Similarly, a Vendor can prepare a Superfingerprint designed to detect and subsequently enable prevention of an infringing use of a legitimate copy of the Vendor's software and deposit it with a Guardian Center 130. A User Device 140 receives the Superfingerprint during a Call-Up, and the Supervising Program 211 within the User Device 140 employs the Superfingerprint to detect and halt infringing use of the copy of software.

One type of data included in a Superfingerprint is a list of hash function values computed on portions of the infringing software SW. Let H be a hash function specified in the Superfingerprint. LHASH(SW) is a list of hash function values resulting from computing the specified hash function H on specified portions of the software SW. A portion of a software SW refers to the text or data comprising SW or to a collection of parts of the text or data comprising SW, where the parts need not be contiguous and may overlap.

A hash function F is a mathematical function for mapping data X to data F(X) such that if X and Y are unequal, then it is highly likely that F(X) and F(Y) are unequal. In an example hash function, X can be a sequence of bytes. Let p be a randomly chosen, but henceforth-kept fixed, 64 bit prime number. The sequence X of bytes is viewed as a number (written to the base 256, where the bytes are the digits of that number) and F(X)=X mod p. Thus the value F(X) is a 64 bit string, no matter how long X is. Another example of a hash function is the identity function I(X)=X which simply reproduces the string X.

If LHASH(SW) is a list of hash function values included in a Superfingerprint sent by the Guardian Center 130 to a User Device 140, the Supervising Program 211 employs this list to detect an infringing copy of software or an infringing use of a copy of the software SW by performing hash function value checking. In a same-location hash function value checking, the Supervising Program 211 computes, by use of the hash function H specified in the Superfingerprint, hash function values of portions of a copy of software SW_1 used on the User Device 140, where these portions correspond to the portions of SW for which hash function values were computed in preparing LHASH(SW). For example, if SW is an array of words and a portion of SW was specified as the sequence of the first letters of each word of SW starting with the 1000-th word of SW and ending with the 2000-th word of SW, then the corresponding portion of SW_1 is the sequence of the first letters of each word of SW_1 starting with the 1000-th word of SW and ending with the 2000-th word of SW_1. The same-location computed list of hash function values for SW_1 is LHASH (SW_1). The same-location hash function value checking continues by comparing the hash function values in the lists LHASH(SW) and LHASH(SW_1) at corresponding locations; that is, the first value in LHASH(SW) with the first value in LHASH(SW_1), the second with the second, etc. If more than a number specified in the Superfingerprint of these compared values are equal then the Supervising Program continues processing on the assumption that SW and SW_1 are equal or that SW_1 is a slightly modified form of SW.

In general-location hash function value checking, the Supervising Program 211 selects, based on rules specified in the Superfingerprint, portions of the copy of software SW_1 used on the User Device 140 and computes a list L(SW_1) of the hash function values by H, of the selected portions. For example, the selected portions may be all sequences of the first letters of sequences of consecutive words in SW_I, each sequence of words comprising 1000 words. The general-location hash function value check continues by counting the number of hash function values common to the lists LHASH(SW_1 and L(SW_1), irrespective of location within the lists. The Supervising Program 211 then checks whether that counted number is greater than a number specified in the Superfingerprint and if so the Supervising Program 211 continues processing on the assumption that SW and SW_1 are equal or that SW_1 is a slightly modified form of SW.

A Superfingerprint also includes a weight value ("w") and rules specifying when various checks included in the Superfingerprint should actually be performed by the Supervising Program 211. If two Superfingerprints SPT_1 and SPT_2 are stored in a User Device 140 and have respectively associated weights w=1 and w=7 then for every 7 times that the Supervising Program 211 in that User Device 140 performs the checks and runs the programs included in SPT_2 (executes SPT_2), the Supervising Program 211 executes SPT_1 once. If a Superfingerprint includes a program P, then a rule in the Superfingerprint may specify conditions that must hold for the Supervising Program to execute P while executing the Superfingerprint. An example of such a rule is that P is executed only if the copy of software SW_1 examined for being infringing software, is larger in size than a number specified in the rule.

A Superfingerprint also includes computer programs called by the Supervising Program 211 in order to detect whether a copy of software SW_1 used on the User Device 140 is infringing software or, in other cases, legitimate Vendor software used on the User Device 140 not in accordance with the Usage Policy attached to that software. Examples of such detection software include, but are not limited to the following.

A pirating Vendor may infringe on another Vendor's rights by taking that Vendor's legitimate software SW and distributing it in an encrypted form SW_1 where each installed copy is encrypted by a different encryption key. This attack would defeat the straightforward use of the hash function value checking mechanisms described above. To counter this attack, the legitimate Vendor creates a Superfingerprint which includes an appropriate list LHASH(SW) of hash function values of portions of the software SW, and a decryption program ("DEC"). When the User Device 140 uses the infringing software SW_1, the Supervising Program 211 calls the program DEC that identifies the decryption key used to turn SW_1 into executable code, and then uses the decryption key to decrypt SW_1. Once SW_1 has been decrypted, the Supervising Program 211 performs a hash function value check in the manner detailed above, using the list LHASH(SW) included in the Superfingerprint.

Other types of programs that may be included in a Superfingerprint, monitor behavioral characteristics of the copy of software SW_1 used on a User Device 140 and match those observed characteristics to data included in the Superfingerprint. An example of behavioral characteristics of software which an application program are the specific library calls that the application program is making, the frequency of such calls and the conditions that trigger these calls. For appropriately selected characteristics, if the behavioral profile observed for the copy of software SW_1 used on the User Device 140 is closer to the behavioral profile of the legitimate Vendor's software SW than a parameter specified in the Superfingerprint, this is proof that SW_1 is an infringing copy of SW.

Another example of an infringement detecting program applies to the detection of infringing video game software. In this example, the legitimate video game SW involves an image of a dragon. The infringing software SW_1 is a rewritten version of the game SW that looks identical to the user. Thus the dragon depicted by SW_1 is identical or almost identical to the dragon depicted by the legitimate SW. In this case the infringement detecting program included in a superfingerprint monitors the execution of the game software SW_1 on the User Device 140 and captures frame buffer contents created by SW_1. The captured frame buffer contents is compared by the infringement detecting program with a pixel array stored in the superfingerprint, which is a representation of the dragon image in the game software SW. If the frame buffer contents and the stored pixel array are closer to each other than a parameter specified in the superfingerprint then the infringement detecting program continues processing under the assumption that SW_1 is infringing software.

In an alternative embodiment, a superfingerprint can include a program to check whether a given copy of software C is a variant of protected software SW. An example of such a program is one that computes some statistical property of SW such as the number of loops, the number of procedures, or the number of floating point instructions and determines whether the copy of software C has that same number. If so, this may be evidence that software C is a variant of protected software SW The Guardian Center 130 sends Superfingerprints in the Continuation Message 140. These sent Superfingerprints are called NewSuperfingerprints. The Superfingerprints previously sent to or installed on a User Device are called PreviousSuperfingerprints. Altogether, they are called AllSuperfingerprints. The Guardian Center 130 furthermore computes a hash function value of AllSuperfingerprints, denoted HASH(AllSuperfingerprints).

An unaliasable hash function H is a fingerprinting function having the further property that given X, it is easy to compute H(X), but it is intractable to produce a pair X and Y such that H(X)=H(Y) and X and Y are different. The term "intractable" means that the computational time required is practically unfeasible in the size of X, according to the present state of the art. An example of a class of unaliasable hash functions is provided by the SHA-1 Federal Information Processing standard, published by the National Institute of Standards. In this embodiment a publicly known unaliasable hash function is denoted simply as HASH.

The Supervising Program 211 accepts the Continuation Message 104 only if the hash function value and the result of the computation of the hash function value on the received Superfingerprints together with the Superfingerprints already present in the device are equal. In an alternative embodiment, the expression HASH (NewSuperfingerprints)) is sent, and the Guardian Center 130 instructs the User Device 140 to delete previously kept Superfingerprints. In that case, the Supervising Program 211 accepts the Continuation Message 104 only if the received hash function value HASH(NewSuperfingerprints) and the result of the computation of the hash function on the received Superfingerprints are equal.

Several variants of these mechanisms are included in the present invention. One variant is to omit specification of weight from Superfingerprints, so all Superfingerprints are chosen for execution by the Supervising Program 211 with equal probability.

In another variant, the User Device's Supervising Program 211 can request a Superfingerprint for a copy of software SW used on the User Device 140 from the Guardian Center 130, based on indications that the copy of software SW is infringing. This variant can be employed only if considered not to impinge on privacy, since it identifies software that a given User Device 140 may be using illegally.

In yet another variant, when preparing a Superfingerprint for software which is a computer program, the hash function value computation may treat several operation codes as being equivalent. This is useful when different operation codes have essentially the same functionality depending on the arguments. In addition, the program associated with the Superfingerprint can ignore no-operation instructions or can ignore certain parts of instructions such as the memory or register locations included in the instructions.

An action taken by the Supervising Program 211 upon detecting use of an infringing copy of software or of infringing use of a legitimate copy of software on a User Device 140, can be to halt the use. A multiplicity of forms of actions upon detection of infringing software on a User Device 140, are available as described in co-pending U.S. patent application Ser. No. 09/305,572 filed May 5, 1999 incorporated herein by reference in its entirety. The actions range from sending a warning message to shutting down the User Device 140. One variant is to ask the Guardian Center 130 for guidance. In one embodiment, legal action against a User employing infringing software is not possible because the anonymity of every User Device 140 during Guardian Center 130 Call-Ups is preserved. Furthermore, the detection of the presence of infringing software on a User Device 140 is effected within the User Device 140 and is not revealed to any outside entity.

Punitive Actions

There may be times when a User Device 140 cannot reach the Guardian Center 130 (the Guardian Center 130 should be highly distributed, so this eventuality should occur only when there is a network failure). In these situations, even though a User Device 140 fails to perform a Call-Up when it should, the measures taken by the Supervising Program 211 should fall short of halting processing on the User Device 140, though increasing in severity. To this end, the following punitive actions can be implemented for use by the Supervising Program 211: (1) Disable volume; (2) Disable color on the display unit; (3) Reduce the size of virtual memory; and, (4) Fill the disk with many small files.

For any of these punitive actions, the method to undo the punitive action is recorded in a file called LOCFILE, encrypted with the public key of the Guardian Center 130. At the next Call-Up, the Guardian Center 130 decrypts LOCFILE and sends it back as part of the Continuation Message 104. The Supervising Program 211 applies the undo methods in LOCFILE to bring the User Device 140 back to peak operation.

Enabling the Use of a Copy of Software

Figure 15:
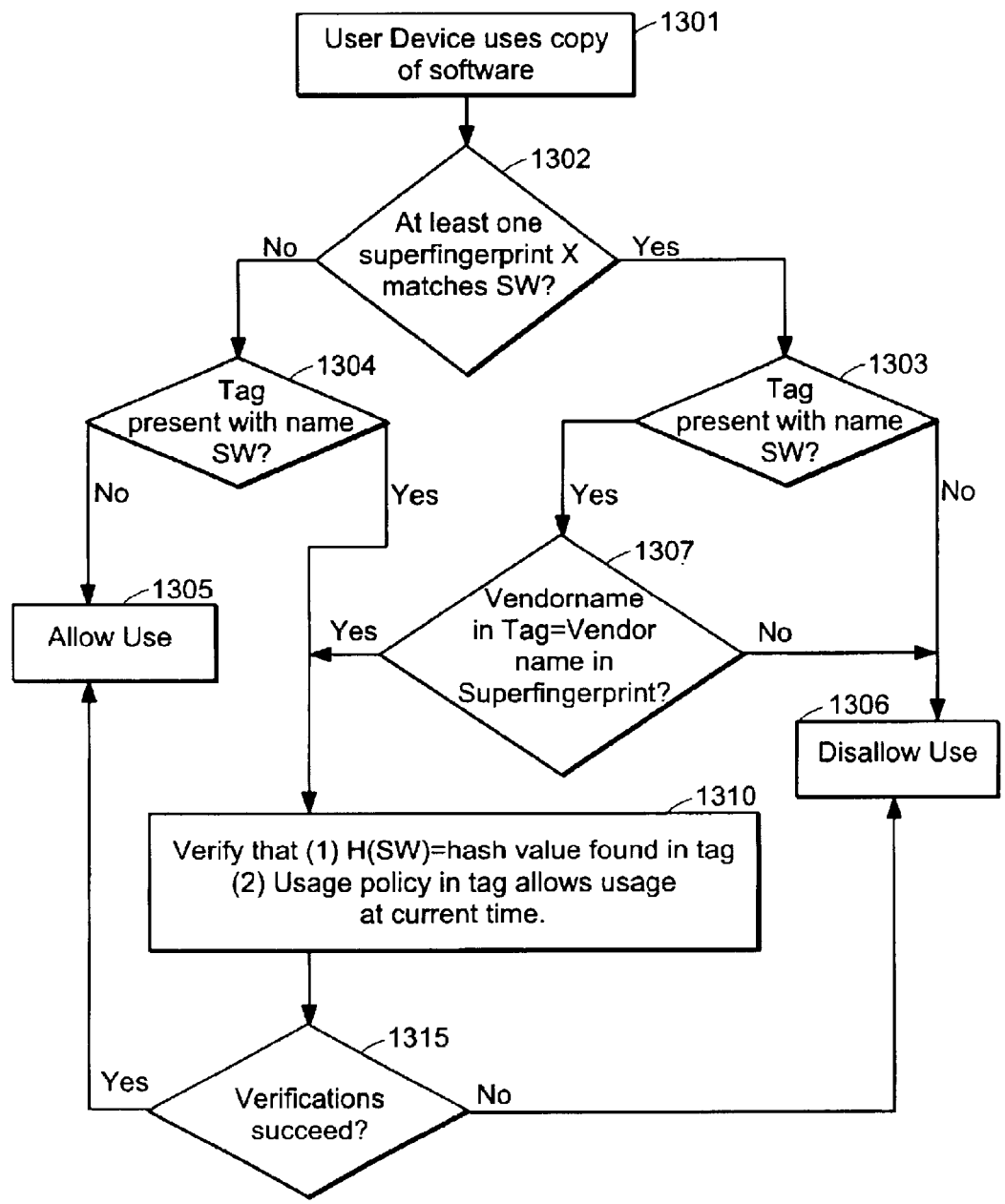
FIG. 15 is a flowchart illustrating the verification steps to check whether a copy of software can be used.

FIG. 15 is a flowchart illustrating the verification steps to check whether a copy of software can be used.

At step 1301, a User Device 140 uses a copy of software SW (for example, executing the software if the software is a program). Processing continues with step 1302.

At step 1302, the copy of software SW is checked by the Supervising Program 211 in the User Device 140 using one or more of the Superfingerprints stored in the User Device 140. A Superfingerprint is said to match a copy of software SW if the hash function value checks specified in the Superfingerprint and the execution of the programs included in the Superfingerprint result in the determination that SW is an infringing copy of software or that SW is a copy of legitimate Vendor supplied software. If there is no Superfingerprint match, execution proceeds to step 1304. If there is at least one Superfingerprint that matches the copy of software SW, then execution proceeds to step 1303.

At step 1303, a check is made to determine if a tag 605 (FIG. 7) associated with the copy of software SW is present in the User Device's Tag Table 601 (FIG. 7). If not, processing continues with step 1306. If a tag associated with the copy of software SW is found in step 1303, then execution proceeds to step 1307.

At step 1304, a check is made to determine if a Tag 605 (FIG. 7) associated with the copy of software SW is present in the User Device's Tag Table 601 (FIG. 7). If not, processing continues with step 1305. If a tag associated with the copy of software SW is found, then execution proceeds to step 1310.

At step 1305, the Supervising Program allows use of the copy of software SW. Processing is complete.

At step 1306, the copy of software is treated as infringing software, use of software is disallowed. Processing is complete.

At step 1307 the Vendor's name included in the Tag (or the owner of the digital signature used to sign the purchase order in the Tag) is checked against the Vendor names included in all matching Superfingerprints. If any one of these names does not match, the copy of software SW is treated as incorrectly tagged and processing continues with step 1306. If all the Vendor names included in matching Superfingerprints are equal to the Vendor name included in the Tag, then execution proceeds to step 1310.

At step 1310, several tests are performed. First the hash function value of the copy of software SW is computed and is compared with the hash function value found in the Tag. Next the Usage Policy in the Tag is checked to confirm that the current use of the copy of software SW is allowed. Processing continues with step 1315.

At step 1315, the result of the tests are verified. If all the verifications succeed, processing continues with step 1305. If not, processing continues with step 1306.

Supervising Programs Outside of Operating System

In one embodiment, the Supervising Program 211 is either part of the operating system or linked to the operating system. In an alternative embodiment, one or more Supervising Programs 211 may reside outside of the operating system. A Supervising Program 211 must be present to make possible a use of a copy of software protected by the present invention, on a User Device 140. This is achieved by incorporating procedures into the Supervising Program 211 required by the copy of software. For example, a procedure within the Supervising program 211 may execute a collection of operating system calls required for use of the copy of software. In addition, each Supervising Program 211 performs tag checking. Purchasing and Decommissioning do not change since they are independent of the operating system.

Zero Information Call-Up

Figure 16A:
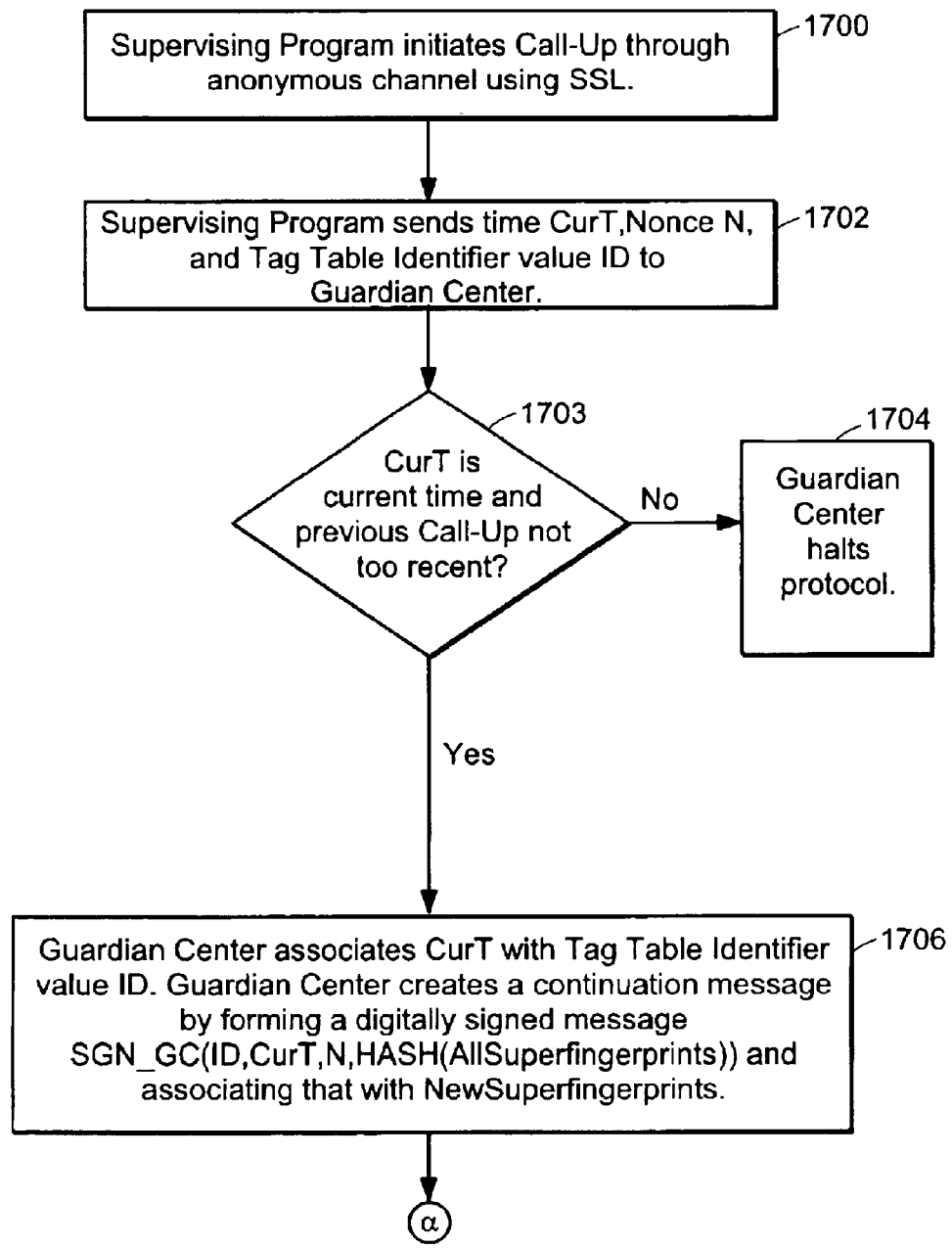
FIGS. 16A–B is a flowchart illustrating the steps for yet another method for performing a Call-Up.
Figure 16B:
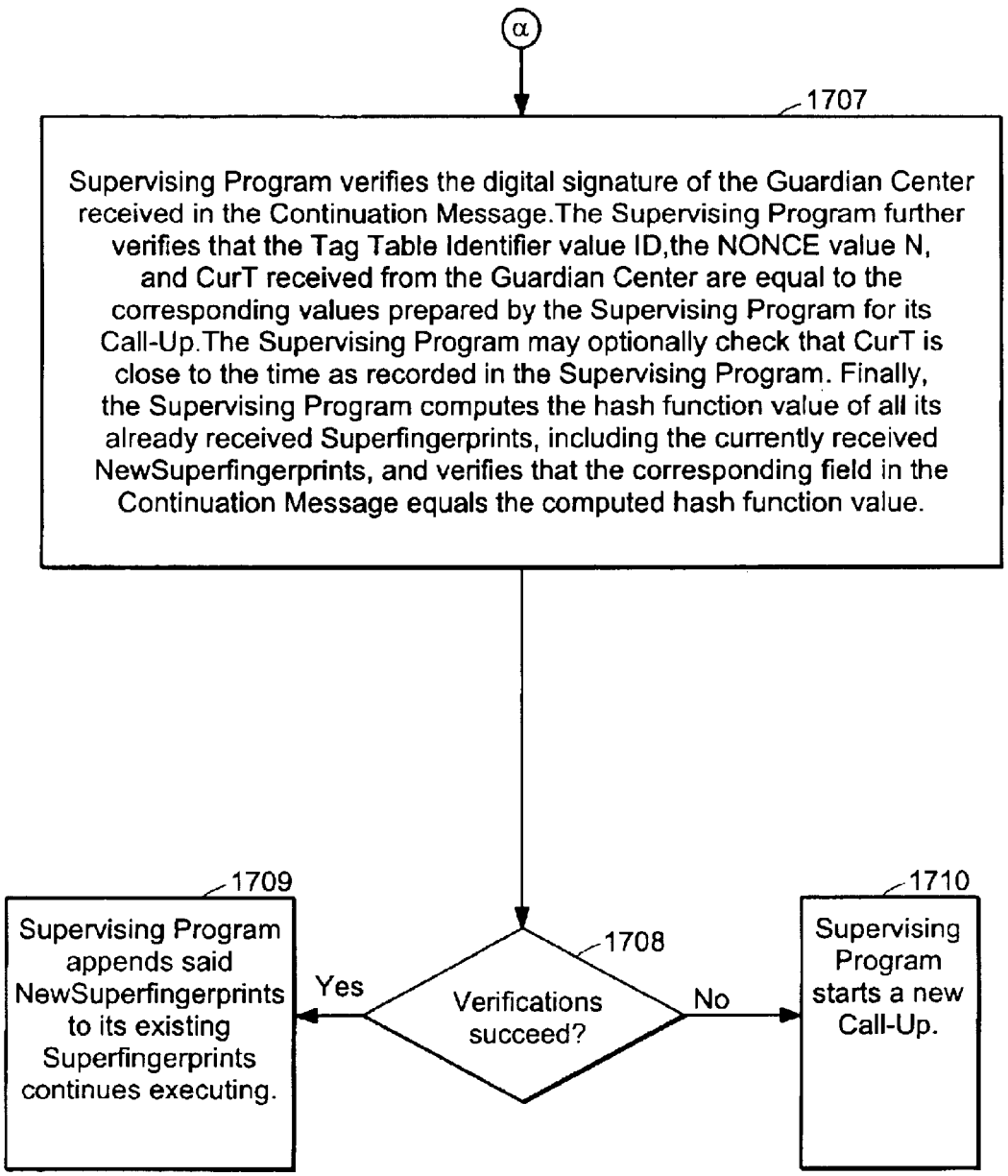

FIGS. 16A–B are a flowchart illustrating the steps for another method for performing a Call-Up. The alternative embodiment shown in FIGS. 16A–B sends less information during a Call-Up than the embodiment described in conjunction with FIGS. 11A–B. In the embodiment shown in FIGS. 16A–B, the information sent from the User Device 140 to the Guardian Center 130 during a Call-Up is independent of the software installed and the state of the data in the User Device 140.

This embodiment assumes that there is a Tag Table Identifier value ID 604 that the Supervising Program 211 can read reliably. The Tag Table Identifier value ID 604 comes from a sparse set to avoid a denial of service attack. Call-Ups occur according to a Call-Up policy as described above. Purchases, decommissioning, and enabling the use of a copy of software, all occur as described above. The only protocol that changes is the Call-Up itself. Like Privacy-Preserving Call-Ups, Zero Information Call-Ups take place through secure and anonymous communication channels.

A concept that is specific to this protocol is the notion of an "early Call-Up." An early Call-Up occurs when a Call-Up message with Tag Table Identifier value ID 604 occurs earlier than MinDif minutes after the previous Call-Up message with the same Tag Table Identifier value ID 604, where MinDif is a parameter of the Call-Up policy.

Turning to FIG. 16A, at step 1700, a secure communication channel is established between the User Device 140 and the Guardian Center 130, using, for example, the SSL protocol offered by Netscape Corporation already described in conjunction with FIGS. 11A–B. Processing continues with step 1702.

At step 1702 the Supervising Program 211 in the User Device 140 sends a Tag Table Identifier value ID 604 and the current time CurT to the Guardian Center 130. The Supervising Program 211 retains this current time CurT. In an alternate embodiment, the Supervising Program 211 may also send a NONCE value N. Processing continues with step 1703.

At step 1703, the Guardian Center 130 verifies that the time CurT is close to the time recorded at the Guardian Center 130 and that the last time a Call-Up message with the Tag Table Identifier value ID 604 was received by the Guardian Center 130 was not too recent, i.e., was at least MinDif minutes earlier than CurT where MinDif is a parameter of the Call-Up policy. If so, processing continues with step 1706. If not, processing continues with step 1704.

In an alternate embodiment, processing may continue with step 1706 even if the current Call-Up message with the Tag Table Identifier value ID 604 is an early Call-Up.

In this embodiment, every User Device 140 has an allocation of early Call-Ups, for example, 5 per day. If the number of early Call-Ups does not exceed this allocation, then the Guardian Center 130 treats the Call-Up as if it were not early by continuing with step 1706.

At step 1704 the Guardian Center 130 does not return a Continuation Message 104 to the User Device 140. Processing is complete.

At step 1706 the Guardian Center 130 records the time of the current Call-Up and associates the time with the Tag Table identifier value ID 604. The Guardian Center 130 forms a digitally signed message SGN_GC(ID, CurT, N, HASH(AllSuperfingerprints)), where AllSuperfingerprints are as specified in the Section Superfingerprint Use and Download. The Guardian Center's Continuation Message to the Supervising Program 211 includes the digitally signed message and NewSuperfingerprints. Processing continues with step 1707 (FIG. 16B).

Continuing with FIG. 16B, at step 1707, upon receiving the signed Continuation Message 104 (FIG. 1), the Supervising Program 211 verifies the digital signature of the Guardian Center 130 received in the Continuation Message 140, using the Public Key 318 (FIG. 3) of the Guardian Center 130. The Supervising Program 211 verifies that the Tag Table Identifier value ID 604, the NONCE value N, and CurT received from the Guardian Center 130 are equal to the corresponding values prepared by the Supervising Program 211 when preparing its Call-Up. The Supervising Program 211 may optionally check that CurT is close to the time as recorded in the Supervising Program 211. Finally, the Supervising Program 211 computes the hash function value of all its already received Superfingerprints, including the currently received NewSuperfingerprints, and verifies that the fourth field HASH(AllSuperfingerprints) in the Continuation Message 104 equals the computed hash function value. Processing continues with Step 1708.

At step 1708, if all the above verifications are successful, processing continues with step 1709. If the verifications fail, processing continues with step 1710.

At step 1709, the Supervising Program 211 appends the NewSuperfingerprints to its existing Superfingerprints in the Tag Table 601 and continues execution.

At step 1710, the Supervising Program 211 takes punitive action. The secure communication channel between the Supervising Program 211 and the Guardian Center 130 is closed.

If the Supervising Program 211 never receives a Continuation Message 104 in response to a given Call-Up Message, it simply sends a new one with a new current time CurT. (It does not repeat the previous Call-Up Message as was the case with the Privacy-Preserving Call-Up method.) When using this protocol the only data that needs to be saved in case of failures is the Tag Table Identifier 604 and the tags 605 that are purchased. The next Call-Up message in this case includes an indication that a full set of Superfingerprints are required as all the old ones have been lost. There can be an allocation of the number of failures allowed to a given Tag Table Identifier ID 604.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for supervising usage of software on a user device comprising the steps of:

computing, by a supervising program within said user device, a first hash function value of a tag table;

sending, by said supervising program, a call-up message to a guardian center, said call up message comprising said first hash function value, an identifier value of said tag table, and a second hash function value of said tag table sent in a previous call-up message;

verifying, by said guardian center, that said hash function value of said tag table sent in said previous call-up message is a most recently stored value in a list of hash function values stored by said guardian center and associated with said identifier value of said tag table;

upon successful verification by said guardian center, appending said received first tag table hash function value to said list of hash function values associated with said identifier value of said tag table; and sending, by said guardian center, a continuation message to said supervising program, said continuation message comprising a superfingerprint and a portion of said call-up message to detect and halt the duplication of a tag table on several user devices;

said superfingerprint comprising a list of hash functions resulting from hashes performed on software, a weight value W which defines how many times the supervising program should run, program P and conditions that the supervising program must hold in order to run P, and computer programs used by the supervising program to detect invalidly running software.

2. The method of clam 1 further comprising the steps of:
upon receiving said continuation message, verifying, by said supervising program, that a portion of said continuation message is equal to said corresponding portion sent in said call-up message; and upon successful verification, by said supervising program, allowing by said supervising program continued use of said copy of software associated with said tag in said tag table on said user device.

3. The method of claim 2, further comprising the step of:
upon failure of said verification, by said supervising program, of said portion of said continuation message, resending by said supervising program said call-up message to said guardian center.

4. The method of claim 2 further comprising the step of:
replacing, by said supervising program, within said tag table said hash function value of said tag table sent in said previous call-up message by said hash function value of said tag table sent in said current call-up message.

5. The method of claim 2 comprising the further step of:
replacing, by said supervising program, within said tag table said hash function value of said tag table sent in said continuation message received in said previous call-up by said hash function value of said tag table sent in said continuation message received in said current call-up.

6. The method of claim 2 further comprising the step of:
measuring, by said supervising program, an elapsed time between a first call-up to a guardian center and a second call-up to a guardian center, by use of one or more event counters.

7. The method of claim 6 wherein said event counters are updated periodically as recorded by a clock.

8. The method of claim 6 further comprising the steps of:
storing by said guardian center, a current time value in said continuation message; and setting, by said supervising program, an event counter to said curt time.

9. The method of claim 2 further comprising the steps of:
storing by said supervising program, a plurality of tag tables, said tag tables having said tag table identifier value of said tag table whose hash function values were sent to said guardian center in a plurality of most recent call-ups, each of said tag tables storing user device descriptive values;

storing, by said guardian center, in said continuation message, a plurality of hash function values of said tag tables sent in said plurality of said most recent call-ups; and upon receiving said continuation message, said supervising program, computing hash function values of said stored plurality of tag tables and further verifying that said computed hash function values are equal to said hash function values in said continuation message.

10. The method of claim 9 further comprising the step of:
checking, by said supervising program, whether said user device descriptive values in said tag tables whose hash functions were sent in said plurality of most recent call-ups belong to a plurality of user devices.

11. The method of claim 10 wherein the step of checking further comprises the step of:
searching said plurality of tag tables for two successive tag tables including user device descriptive values which differ by more than a specified number of corresponding values.

12. The method of claim 11 wherein the step of checking further comprises the step of:
searching said plurality of tag tables for a first tag table, a second tag table and a third tag table, the second tag table sent in a call-up that occurred later than a call-up in which said first tag table was sent and said third tag table sent in a call-up that occurred later than said call-up in which said second tag table was sent and wherein said user device descriptive values stored in said first tag table and in said second table differ in more than a specified number of corresponding values and said user device descriptive values stored in said first tag table and in said third tag table differ in fewer than a specified number of corresponding values.

13. The method of claim 10 further comprising the step of:
disabling future call-up messages including said tag table identifier value by said guardian center upon determining that said user descriptive values in tag tables sent in said plurality of most recent call-ups belong to a plurality of user devices.

14. The method of claim 2 wherein said call-up message includes a new randomly chosen value occurring only once.

15. The method of claim 2 further comprising the step of:
upon receiving said continuation message, verifying by said supervising program, that a total usage measured across all items in said tag table exceeds a total usage measured across all items in said tag table associated with said previous call-up message.

16. The method of claim 1 further comprising the steps of:
upon filling to receive said continuation message within a timeout period, said supervising program resending said call up message to said guardian center, and upon receiving said resent call-up message from said supervising program, resending, by said guardian center, said continuation message previously sent in response to the resent call-up message upon verifying that said received resent call up message equals said previously received call-up message.

17. The method of claim 1 further comprising the step of:
upon receiving said message from said guardian center, invalidating said tag table by said supervising program.

18. The method of claim 17 further comprising the step of:
upon failure of said verification, rejecting, by said guardian center further call-ups including said tag table identifier value.

19. The method of claim 1 wherein said call-up to a guardian center occurs each time an operating system or said supervising program are loaded into memory in said user device.

20. The method of claim 1 wherein said continuation message includes a superfingerprint.

21. The method of claim 20 further comprising the steps of:

including a current user device time on said user device in said call-up message;

verifying, by said guardian center whether said current user device time is within a specified tolerance of a clock time on said guardian center, computing, by said guardian center, a hash function value of superfingerprints included in continuation messages sent to said supervising program in response to previous call-up messages and included in said continuation message, said superfingerprints included in said continuation messages sent to said supervising program in previous call-ups being stored on said user device;

storing, by said guardian center, said bash function value in said continuation message forwarded to said supervising program;

verifying, by said supervising program, that a hash function value of said superfingerprints stored on the user device and included in said continuation message is equal to said received hash function value; and appending, by said supervising program, on said user device said new superfingerprint to said superfingerprints stored on said user device.

22. The method of claim 1 wherein said call-up message includes a current user device time on said user device.

23. The method of claim 22 wherein the step of verifying further comprises the step of:

verifying, by said guardian center whether said current user device time is within a specified tolerance of a clock time on said guardian center.

24. The method of claim 1, wherein the step of verifying further comprises the step of:

verifying, by said guardian center that a time difference between said arrival of said call-up message and said previous call-up message exceeds a specified minimum.

25. The method of claim 1 wherein the step of verifying further comprises the step of:

verifying by said guardian center that a time difference between said arrival of said call-up message and said previous call-up message is below a specified maximum.

26. The method of claim 1 wherein said call-up message and said continuation message are sent over a secure channel.

27. The method of claim 1 wherein upon detecting use of the infringing copy of software in the user device, the supervising program in the user device halts use of the infringing copy.

28. The method of claim 1 wherein the continuation message is digitally signed.

29. The method of claim 1 wherein the tag table identifier value is generated by hardware.

* * * * *

UNITED STATES PATENT AND TRADEMARK OFFICE
CERTIFICATE OF CORRECTION

PATENT NO. : 6,889,209 B1
DATED : May 3, 2005
INVENTOR(S) : Michael O. Rabin and Dennis E. Shasha It is certified that error appears in the above-identified patent and that said Letters Patent is hereby corrected as shown below:

Column 37,
Line 5, delete "curt" and insert -- current --.

Column 38,
Line 2, delete "filling" and insert -- failing --.

Column 39,
Line 7, after "center" delete the comma and insert a semicolon.
Line 7, beginning with "computing," insert a new paragraph.
Line 15, delete "bash" and insert -- hash --.

Column 40,
Line 1, after "1" delete the comma.

Signed and Sealed this

Thirteenth Day of September, 2005

JON W. DUDAS
*Director of the United States Patent and Trademark Office*